(12) United States Patent
Ito et al.

(10) Patent No.: US 11,998,881 B2
(45) Date of Patent: Jun. 4, 2024

(54) STIRRING AND DEFOAMING DEVICE

(71) Applicant: SHASHIN KAGAKU CO., LTD., Kyoto (JP)

(72) Inventors: Yuji Ito, Kyoto (JP); Fumihiko Takaoka, Kyoto (JP)

(73) Assignee: SHASHIN KAGAKU CO., LTD., Kyoto (JP)

( * ) Notice: Subject to any disclaimer, the term of this patent is extended or adjusted under 35 U.S.C. 154(b) by 444 days.

(21) Appl. No.: 17/440,792

(22) PCT Filed: Mar. 19, 2020

(86) PCT No.: PCT/JP2020/012548
§ 371 (c)(1),
(2) Date: Sep. 20, 2021

(87) PCT Pub. No.: WO2020/203376
PCT Pub. Date: Oct. 8, 2020

(65) Prior Publication Data
US 2022/0161208 A1 May 26, 2022

(30) Foreign Application Priority Data
Mar. 30, 2019 (JP) ................................. 2019-069493

(51) Int. Cl.
*B01D 19/00* (2006.01)
*B01F 9/22* (2006.01)
(Continued)

(52) U.S. Cl.
CPC .... *B01F 29/40365* (2022.01); *B01D 19/0052* (2013.01); *B01F 29/10* (2022.01); *B01F 33/70* (2022.01)

(58) Field of Classification Search
CPC .... B01F 29/40365; B01F 29/10; B01F 33/70; B01D 19/0052; B01D 19/0005; B01D 19/0036
(Continued)

(56) References Cited

U.S. PATENT DOCUMENTS

| | | | |
|---|---|---|---|
| 2007/0025180 A1* | 2/2007 | Ishii | B01F 33/70 366/144 |
| 2020/0232850 A1* | 7/2020 | Takaoka | B01D 19/02 |
| 2023/0049238 A1* | 2/2023 | Kaneko | B01F 29/10 |

FOREIGN PATENT DOCUMENTS

| | | |
|---|---|---|
| CN | 204261389 U | 4/2015 |
| JP | H11104404 A | 4/1999 |

(Continued)

OTHER PUBLICATIONS

International Search Report in PCT/JP2020/012548, dated Jun. 16, 2020, 7pp.

(Continued)

*Primary Examiner* — Frank M Lawrence, Jr.
(74) *Attorney, Agent, or Firm* — HAUPTMAN HAM, LLP

(57) ABSTRACT

A stirring and defoaming device is a stirring and defoaming device of a revolution and rotation type, wherein a vacuum unit for sucking air in each container to bring the inside of each container into a vacuum state includes sealing bodies that seal respective containers, a vacuum generation source, a suction path running toward a revolution center with each container as a starting end, passing through the revolution center to go outside the system, and reaching the vacuum generation source placed outside the system, at least part of the suction path being an independent path from the starting end in association with each container, and at least two or more vacuum measurement units, each provided in an independent path.

8 Claims, 24 Drawing Sheets

(51) Int. Cl.
     *B01F 29/00*           (2022.01)
     *B01F 29/10*           (2022.01)
     *B01F 33/70*           (2022.01)

(58) Field of Classification Search
     USPC ......... 96/176, 177, 193, 195, 196, 204, 216;
                                                    95/261, 266
     See application file for complete search history.

(56) References Cited

FOREIGN PATENT DOCUMENTS

| | | |
|---|---|---|
| JP | H11290668 A | 10/1999 |
| JP | 200061207 A | 2/2000 |
| JP | 2001246236 A | 9/2001 |
| JP | 2003245535 A | 9/2003 |
| JP | 2008743 A | 1/2008 |
| JP | 2009208026 A | 9/2009 |
| JP | 2011235201 A | 11/2011 |
| KR | 1020050123053 A | 12/2005 |

OTHER PUBLICATIONS

Written Opinion in PCT/JP2020/012548, dated Jun. 16, 2020, 7pp.
Office Action in CN Application No. 202080024113.9 dated Jun. 1, 2022, 7pp.

\* cited by examiner

STIRRING AND DEFOAMING DEVICE

RELATED APPLICATIONS

The present application is a National Phase of International Application No. PCT/JP2020/012548, filed Mar. 19, 2020, and claims priority based on Japanese Patent Application No. 2019-069493, filed Mar. 30, 2019.

TECHNICAL FIELD

The present invention relates to a stirring and defoaming device of a revolution and rotation type that includes a means for revolving a container and a means for rotating the container, and that can stir and defoam an object to be processed stored in the container.

BACKGROUND ART

There has been known a stirring and defoaming device that stirs and defoams an object to be processed by revolving and rotating a container storing the object to be processed. Such a stirring and defoaming device stirs and defoams an object to be processed such as a liquid in which different liquid materials are mixed or a mixed material of a powder material and a liquid material, by rotating the object to be processed while revolving the object to be processed and applying centrifugal force thereto, and requires both even stirring and the reduction of contained air bubbles. It should be noted that the terms "stirring and defoaming" are described in the specification of the present application as terms meaning the stirring of an object to be processed, defoaming for eliminating bubbles contained in an object to be processed, or both of the stirring and defoaming.

There are cases where stirring and defoaming processing is conducted under atmospheric pressure, and cases where stirring and defoaming processing is conducted under vacuum by sucking air in a container. In the latter, although a device becomes expensive because of providing a vacuum unit, extremely superior advantages are that fine bubbles that have not been fully removed under atmospheric pressure also expand in volume and become easy to remove, so that complete defoaming can be achieved, and the processing time taken for defoaming can be shortened, and thereby productivity can be improved.

As a stirring and defoaming device equipped with a vacuum unit, there has been known a stirring and defoaming device that sucks air in a container to bring the inside of the container into a vacuum state by storing the entire device in a vacuum chamber and evacuating air from the vacuum chamber, for example, as described in Patent Literature 1. However, the drawback of a stirring and defoaming device equipped with a vacuum unit of this type is that there is a large amount of air in the vacuum chamber, evacuation takes time, and therefore it takes time before the inside of the container is brought into a vacuum state. This becomes more obvious when a stirring and defoaming device becomes larger in association with the volumetric increase of materials.

Accordingly, there has also been known a stirring and defoaming device equipped with a vacuum unit that directly sucks air in a container to bring the inside of the container into a vacuum state. The stirring and defoaming devices described in Patent Literatures 2 to 5 each include a sealing body that seals a container, a vacuum pump, and a suction path running toward a revolution center with an opening of the container as a starting end, passing through the revolution center to go outside the system, and reaching a vacuum pump placed outside the system, where these stirring and defoaming devices directly sucks air in the container to bring the inside of the container into a vacuum state.

CITATION LIST

Patent Literature

Patent Literature 1: JP H11-104404 A
Patent Literature 2: JP H11-290668 A
Patent Literature 3: JP 2009-208026 A
Patent Literature 4: JP 2000-061207 A
Patent Literature 5: JP 2001-246236 A

SUMMARY OF INVENTION

Technical Problem

However, in order to appropriately conduct stirring and defoaming under vacuum, simply sucking air in a container via a suction path by driving a vacuum pump is not enough, and appropriate management and control of a vacuum state are important. To this end, the device configuration of a stirring and defoaming device needs to be considered through various technical approaches.

An object of the present invention is to provide a stirring and defoaming device equipped with a vacuum unit that directly sucks air in a container, thus enabling appropriate management and/or control of a vacuum state.

Solution to Problem

A stirring and defoaming device according to the present invention includes:
  a revolution body turnable around a revolution axis;
  at least two or more rotation bodies turnable around respective at least two or more rotation axes on the revolution body, and capable of holding respective containers; and
  a vacuum unit that sucks air in each of the containers to bring an inside of each of the containers into a vacuum state, wherein
  the vacuum unit includes
  sealing bodies that seal the respective containers,
  a vacuum generation source,
  a suction path running toward a revolution center with each of the containers as one of starting ends, passing through the revolution center to go outside a system, and reaching the vacuum generation source placed outside the system, at least part from each of the starting ends of the suction path being one of independent paths in association with a corresponding one of the containers, and
  at least two or more vacuum measurement units each provided on a corresponding one of the independent paths.

According to this configuration, the suction paths are not provided with only one common vacuum measurement unit, but each container is provided with a vacuum measurement unit, and therefore a vacuum state in each container can be accurately recognized, thus enabling appropriate management and/or control of a vacuum state. Specific examples of this configuration include Embodiments 1-1 to 1-7 and Embodiments 2-1 to 2-5 described later.

Here, as one aspect of the stirring and defoaming device according to the present invention, a configuration can be adopted in which a vacuum measurement unit is provided in a space of a container sealed by a sealing body.

Further, in this case, a configuration can be adopted in which a rotation body includes a rotation body main portion, and a peripheral wall portion provided at a tip of the rotation body main portion, and serving as a storage recess that stores the container inside, the sealing body being a sealing lid that is removably mounted to an end of the peripheral wall portion, and seals the storage recess, and the vacuum measurement unit being provided in the sealing lid.

According to this configuration, the vacuum measurement unit is provided at a position nearest to the container, so that a vacuum state in each container can be not only accurately recognized but also readily recognized with no time difference, thus enabling more appropriate management and/or control of a vacuum state. Specific examples of this configuration include Embodiments 1-1, 1-2, and 1-5 to 1-7 and Embodiments 2-1, 2-2, 2-4, and 2-5 described later.

Further, as another aspect of the stirring and defoaming device according to the present invention, a configuration can be adopted in which a vacuum measurement unit has a power supply therein, and has a wireless communication function.

Further, as another aspect of the stirring and defoaming device according to the present invention, a configuration can be adopted in which the vacuum unit further includes at least two or more individually controllable on-off valves each provided on a corresponding one of the independent paths.

According to this configuration, the suction path of each container can be individually on-off controlled, so that a vacuum state in each container can be appropriately controlled based on the accurate recognition of a vacuum state in each container, thus enabling more appropriate management and/or control of a vacuum state. Further, according to this configuration, for example, some containers are not brought into a vacuum state, enabling processing under atmospheric pressure, processing using only some containers, and processing of different kinds of materials (heterogeneous materials) for each container. Specific examples of this configuration include Embodiments 1-1 to 1-7 and Embodiment 2-5 described later.

Further, as still another aspect of the stirring and defoaming device according to the present invention, a configuration can be adopted in which the stirring and defoaming device further includes a revolution shaft that defines the revolution axis, the suction path includes a path passing through an inside of a rotation body with a container as a starting end, a path exiting from the rotation body to run toward the revolution center, a path passing through an inside of the revolution shaft, and a path exiting from the revolution shaft to go outside the system, the path passing through the inside of the rotation body with the container as the starting end and the path exiting from the rotation body to run toward the revolution center are connected to each other via a turning joint, and either the path exiting from the rotation body to run toward the revolution center or the path exiting from the revolution shaft to go outside the system and the path passing through the inside of the revolution shaft are connected to each other via a turning joint.

In this case, a configuration can be adopted in which at least a path passing through an inside of a rotation body with a container as a starting end, a path exiting from a rotation body to run toward the revolution center, and a path passing through an inside of the revolution shaft serve as an independent path in association with each of the containers.

Alternatively, a configuration can be adopted in which the independent paths merge each other in a turning joint between paths exiting from rotation bodies to run toward the revolution center and the path passing through the inside of the revolution shaft.

Another stirring and defoaming device according to the present invention includes:

a revolution body turnable around a revolution axis;

at least two or more rotation bodies turnable around respective at least two or more rotation axes on the revolution body, and capable of holding respective containers; and a vacuum unit that sucks air in each of the containers to bring an inside of each of the containers into a vacuum state, wherein the vacuum unit includes sealing bodies that seal the respective containers, a vacuum generation source, a suction path running toward a revolution center with each of the containers as one of starting ends, passing through the revolution center to go outside a system, and reaching the vacuum generation source placed outside the system, at least part from each of the starting ends of the suction path being one of independent paths in association with a corresponding one of the containers, and at least two or more individually controllable on-off valves each provided on a corresponding one of the independent paths.

According to this configuration, the suction path of each container can be individually on-off controlled, so that a vacuum state in each container can be appropriately controlled, thus enabling appropriate management and/or control of a vacuum state. Further, according to this configuration, for example, some containers are not brought into a vacuum state, enabling processing under atmospheric pressure, processing using only some containers, and processing of different kinds of materials (heterogeneous materials) for each container. Specific examples of this configuration include Embodiments 1-1 to 1-8 and Embodiment 2-5 described later.

Still another stirring and defoaming device according to the present invention includes:

a revolution body turnable around a revolution axis;

a rotation body turnable around a rotation axis on the revolution body, and capable of holding a container; and a vacuum unit that sucks air in the container to bring an inside of the container into a vacuum state, wherein the vacuum unit includes a sealing body that seals the container, a vacuum generation source, a suction path running toward a revolution center with the container as a starting end, passing through the revolution center to go outside the system, and reaching the vacuum generation source placed outside the system, and a vacuum measurement unit provided in a space of the container sealed by the sealing body.

According to this configuration, the vacuum measurement unit is provided at a position nearest to the container, so that a vacuum state in each container can be not only accurately recognized but also readily recognized with no time difference, thus enabling appropriate management and/or control of a vacuum state. Specific examples of this configuration include Embodiments 1-1, 1-2, and 1-5 to 1-7, Embodiments 2-1, 2-2, 2-4, and 2-5, and Embodiments 3-1 and 3-2 described later.

Advantageous Effects of Invention

As above, a stirring and defoaming device according to the present invention enables appropriate management and/or control of a vacuum state.

DESCRIPTION OF EMBODIMENTS

Embodiment 1

Figure 1A:
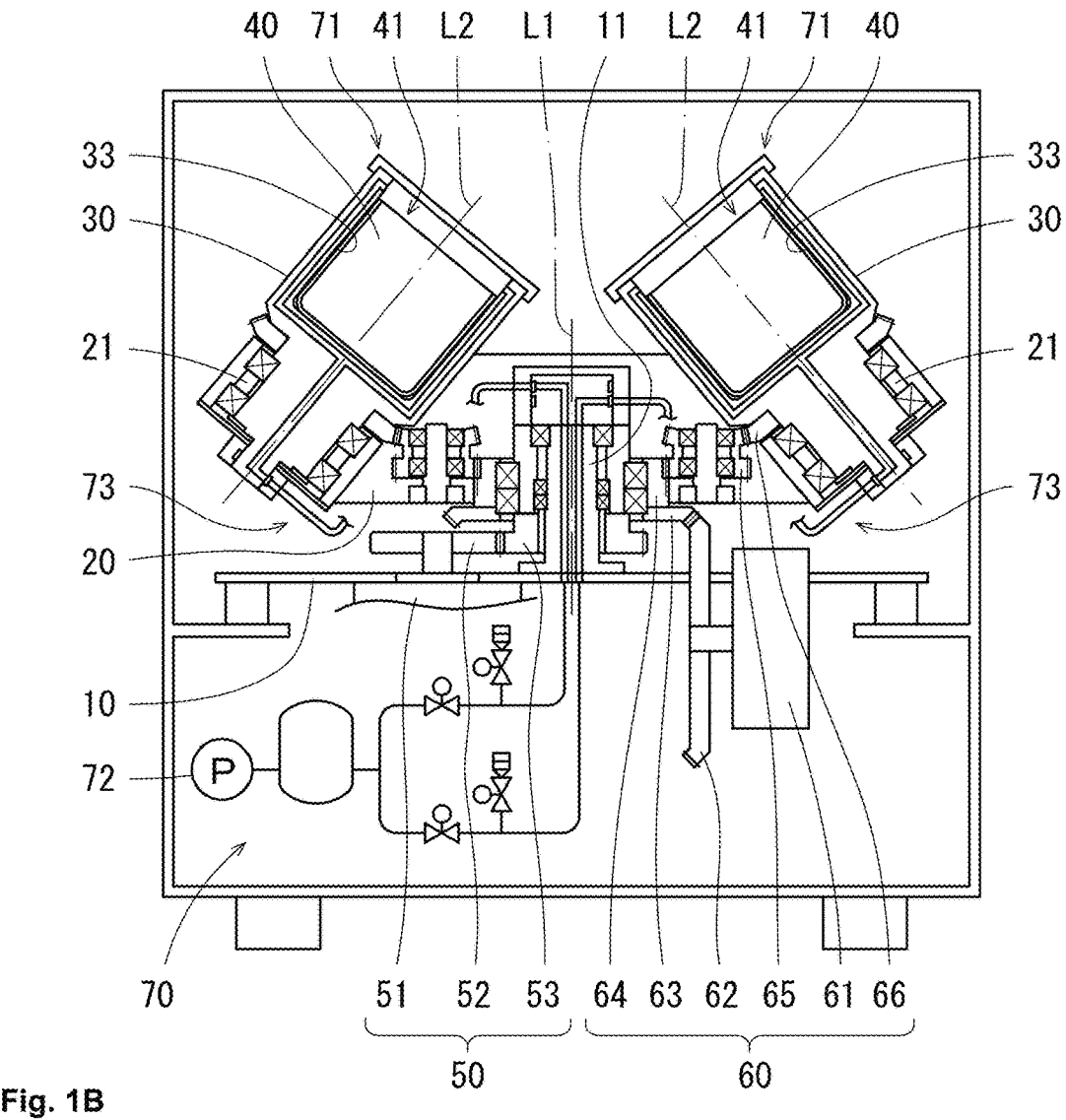
FIG. 1A is a sectional view of a stirring and defoaming device according to Embodiment 1.

Hereinafter, Embodiment 1 of a stirring and defoaming device according to the present invention is described with reference to FIGS. 1A, 1B, and 2. It should be noted that, as will be described later, the stirring and defoaming device according to Embodiment 1 is a stirring and defoaming device having a configuration in which a plurality of (two, in the present embodiment) containers 40 are provided, and a suction path 73 is independently provided for each of the containers 40.

First, an outline of the overall configuration of the stirring and defoaming device is described. As illustrated in FIGS. 1A and 1B, the stirring and defoaming device includes a revolution body 20 turnable around a revolution axis L1, a rotation body 30 turnable around a rotation axis L2 on the revolution body 20, a container 40 held by the rotation body 30, a revolution driving unit 50 that turns and drives the revolution body 20, a rotation applying unit 60 that turns the rotation body 30, and a vacuum means (vacuum unit) 70 that directly sucks air in the container 40 to bring the inside of the container 40 into a vacuum state. It should be noted that, as defined by JIS Z 8126-1:1999 (ISO 3529-1:1981), vacuum means a state of a space filled with gas lower in pressure than normal atmospheric pressure.

The revolution body 20 is turnably supported, via a bearing, on a revolution shaft 11 constituted of a fixed shaft mounted to a base 10. A pair of the rotation bodies 30 are provided at two positions opposite across the revolution axis L1, and are each turnably supported, via a bearing, on an attachment hole 21 formed at an end of the revolution body 20. The rotation body 30 includes a storage recess 33 that stores the container 40. The rotation body 30 stores the container 40 in the storage recess 33, and holds the container 40 directly, or holds the container 40 indirectly via an intermediary body such as an adaptor (not illustrated). In this respect, the rotation body 30 is also referred to as a container holder.

The container 40 is a bottomed container having an upper end serving as an opening 41 and a lower end serving as a closed bottom portion. A material (object to be processed) is put into the container 40 via the opening 41, and a processed object is taken out via the opening 41 after processing. A material of the container 40 is selected from a synthetic resin such as polyethylene, a metal such as a stainless steel or an aluminum alloy, ceramics, paper, or the like, according to the kind of material, details of processing, etc.

The revolution driving unit 50 includes a driving motor 51, a driving gear 52 mounted to a driving shaft of the driving motor 51, and a revolution gear 53 mounted to the revolution body 20 concentrically to the revolution body 20 and meshing with the driving gear 52. Thus, when the driving motor 51 turns, the turn is transmitted to the revolution body 20 via the driving gear 52 and the revolution gear 53, and the revolution body 20 turns around the revolution axis L1. Then, due to the turning of the revolution body 20, the rotation body 30 and the container 40 held by the rotation body 30 revolve around the revolution axis L1.

The rotation applying unit 60 includes a brake device 61 such as a powder brake, a braking gear 62 mounted to a brake shaft of the brake device 61, a sun gear 64 relatively turnably supported, via a bearing, on the revolution body 20, a gear 63 mounted to the sun gear 64 concentrically to the sun gear 64 and meshing with the braking gear 62, an intermediate gear 65 turnably supported, via a bearing, on the revolution body 20 and meshing with the sun gear 64, and a rotation gear 66 mounted to the rotation body 30 concentrically to the rotation body 30 and meshing with the intermediate gear 65. Thus, when braking force of the brake device 61 is applied, the braking force is transmitted to the sun gear 64 via the braking gear 62 and the gear 63, the turning speed of the sun gear 64 decreases compared with the turning speed of the revolution body 20 (a difference arises between the turning speed of the sun gear 64 and the turning speed of the revolution body 20), and the intermediate gear 65 turns relative to the sun gear 64. Then, the turn is transmitted to the rotation body 30 via the rotation gear 66, and the rotation body 30 turns around the rotation axis L2. Then, due to the turning of the rotation body 30, the rotation body 30 and the container 40 held by the rotation body 30 rotate around the rotation axis L2.

The vacuum means 70 includes a sealing means (sealing body) 71 that seals the container 40, a vacuum pump 72 as a vacuum generation source, and a suction path 73 running toward a revolution center with the opening 41 of the container 40 as a starting end, passing through the revolution center to go outside the system (a region outside the system as a movable region of device elements relating to revolution and rotation, i.e., a region that does not interfere with movable device elements), and reaching the vacuum pump 72 placed outside the system. Thus, the inside of the container 40, the suction path 73, and the vacuum pump 72 communicate in an airtight state, and when the vacuum pump 72 is driven, air in the suction path 73 and in the container 40 located farther are sucked, and the inside of the container 40 is brought into a vacuum state.

Figure 1B:
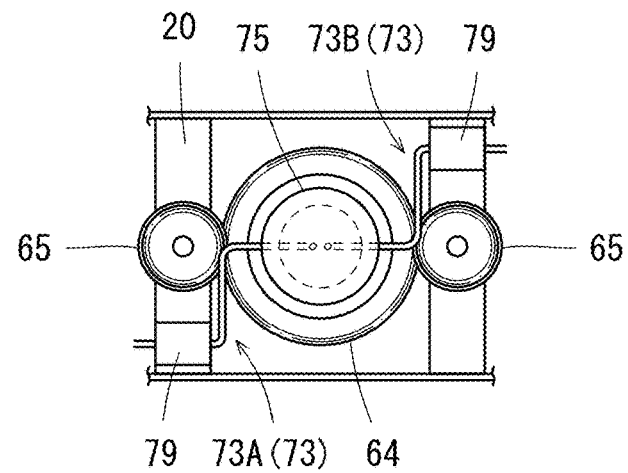
FIG. 1B is a partial top view of the stirring and defoaming device.
Figure 2:
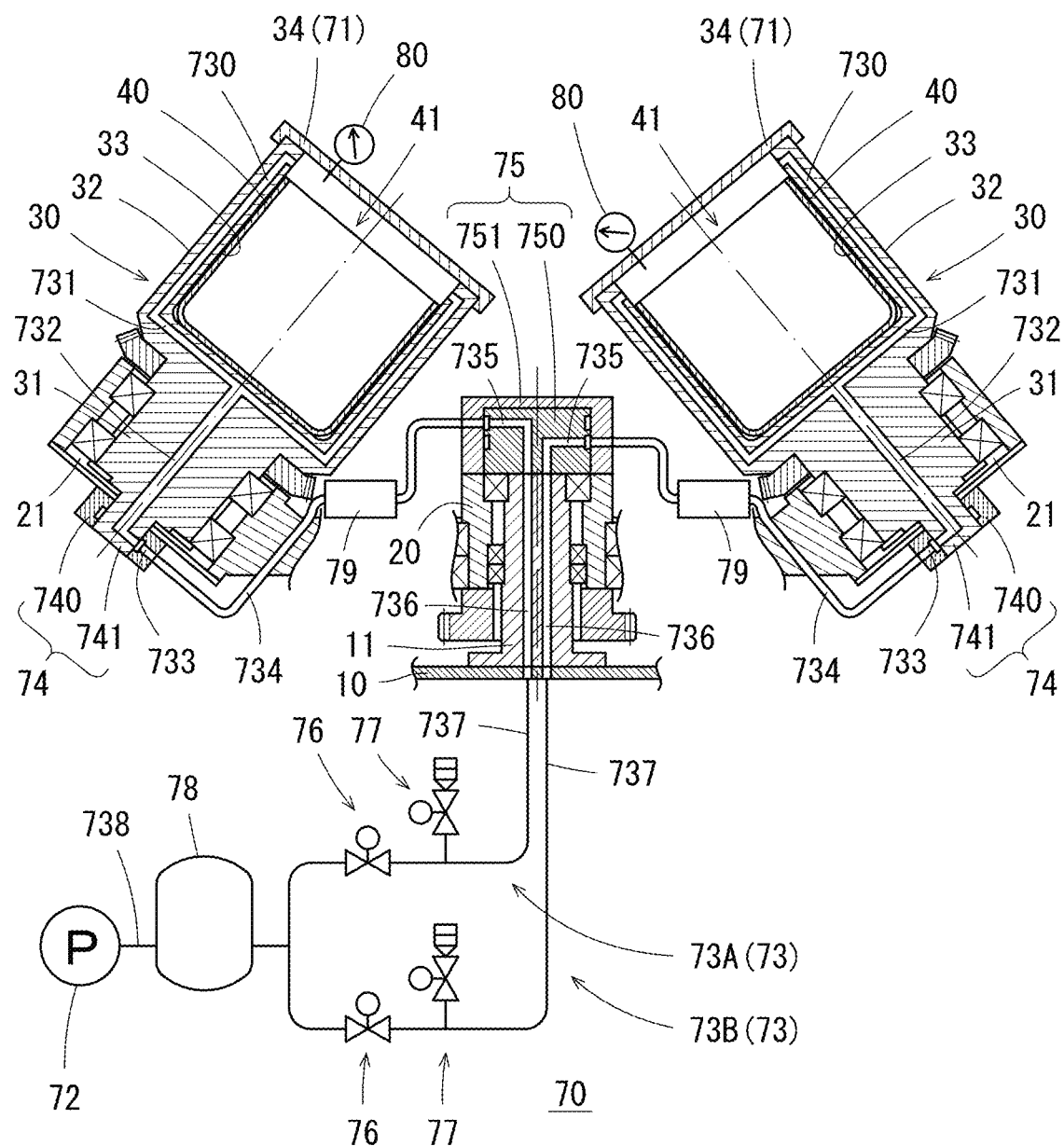
FIG. 2 is a chief part sectional view of a stirring and defoaming device according to Embodiment 1-1.

FIG. 2 is a view in which the description of the device elements related to revolution in FIGS. 1A and 1B is partly omitted so that the device elements related to the vacuum means 70 are easy to understand. The rotation body 30 includes a rotation body main portion 31 that is inserted, turned and supported in the attachment hole 21 formed at the end of the revolution body 20, and a peripheral wall portion 32 integrally formed at a tip (an upper end in the present embodiment) of the rotation body main portion 31, where the inside of the peripheral wall portion 32 serves as the storage recess 33 that stores the container 40. The sealing means 71 is a sealing lid 34 that is removably mounted to an end of the peripheral wall portion 32, and seals the storage recess 33. When the sealing lid 34 is mounted, the storage recess 33 becomes a space which becomes sealed by a bottom portion (the tip of the rotation body main portion 31), the peripheral wall portion 32 and the sealing lid 34, and thus becomes a vacuum chamber. A well-known structure such as a screwing, a fitting, a draw latch, or a fastener can be suitably selected as a structure for mounting the sealing lid 34 to an end of the peripheral wall portion 32.

The suction path 73 is composed of i) a first path 730 having a first end opening in an inner surface of the peripheral wall portion 32 of the vacuum chamber 33, opening in the vacuum chamber 33, and passing through the inside of the peripheral wall portion 32 of the vacuum chamber 33, and a second end reaching a bottom portion of the vacuum chamber 33, ii) a second path 731 having a first end connected to the second end of the first path 730 and passing through the inside of the bottom portion of the vacuum chamber 33, and a second end reaching a rotation center at the bottom portion of the vacuum chamber 33, iii) a third path 732 having a first end connected to the second end of the second path 731 and passing through the inside of the rotation body main portion 31, and a second end reaching an end (a lower end in the present embodiment) opposite the tip of the rotation body main portion 31, iv) a fourth path 733 having a first end connected to the second end of the third path 732 and passing through the inside of a turning joint for rotation 74 provided at the opposite end of the rotation body main portion 31, and a second end reaching an outer surface of the turning joint for rotation 74, v) a fifth path 734 having a first end connected to the second end of the fourth path 733 and running toward a revolution center of the revolution body 20, and a second end reaching an outer surface of a turning joint for revolution 75 provided at a tip (an upper end in the present embodiment) of the revolution shaft 11, vi) a sixth path 735 having a first end connected to the second end of the fifth path 734 and passing through the inside of the turning joint for revolution 75, and a second end reaching a joint surface of the turning joint for revolution 75 to the revolution shaft 11, vii) a seventh path 736 having a first end connected to the second end of the sixth path 735, and passing through the inside of the revolution shaft 11, and passing through the base 10, and a second end reaching the outside of the system (a region outside the system as a movable region of device elements related to revolution and rotation, i.e., a region that does not interfere with movable device elements; in the present embodiment, a region below the base 10), viii) an eighth path 737 having a first end connected to the second end of the seventh path 736 and running toward the vacuum pump 72, and a second end reaching a point before the vacuum pump 72, and ix) a ninth path 738 having a first end connected to the second end of the eighth path 737, and a second end connected to the vacuum pump 72.

The suction path 73 includes one suction path 73A for one container 40 of the two containers 40, 40, and another suction path 73B for the other container 40, where each of the suction paths 73A and 73B is an independent path. However, the second ends of both of the eighth paths 737 are connected to each other, and the ninth path 738 alone is a merged path.

The first path 730 to the fourth path 733, and the sixth path 735 to the seventh path 736 are paths which pass through the inside of metallic members, and are therefore formed by cutting using a drill or the like, or by penetrating a metallic member through other metal processing. The fifth path 734 is a path passing through a space, and is therefore configured by use of a rigid or flexible tube. A part of the fifth path 734 passes through the rotation body 30, and therefore this part is formed by penetration, or is a tube passing through a passage formed for this part. The eighth path 737 and the ninth path 738 are configured by general piping.

The turning joint for rotation 74 is a so-called rotary joint, which is configured by having the opposite end (lower end) of the rotation body main portion 31 as a turning portion 741, and by mounting and fixing a member that is turnably fitted to the turning portion 741 to the revolution body 20, as a fixed portion 740. In other words, the turning joint for rotation 74 is integral with the rotation body 30. However, an independent turning joint (generally, a commercialized product) may be mounted to the rotation body 30.

The turning joint for revolution 75 is a so-called rotary joint, and is composed of a fixed portion 750 mounted to a tip (upper end) of the revolution shaft 11 constituted of a fixed shaft, and a turning portion 751 turnably fitted to the fixed portion 750. In other words, the turning joint for revolution 75 is separate from the revolution shaft 11. However, the turning joint for revolution 75 may be integral with the revolution shaft 11 in such a way that the tip of the revolution shaft 11 serves as a fixed portion.

The turning joint for revolution 75 is a multi-circuit (dual-circuit) type rotary joint in which each of paths (two sixth paths 735, 735) is independent. The paths are isolated from each other by a seal member such as an O-ring or a metal seal. Therefore, fluid flowing in each path does not merge in the turning joint for revolution 75.

The vacuum means 70 further includes an on-off valve 76, an open valve 77, a buffer tank 78, a filter 79, and a vacuum gauge 80 as a vacuum measurement means (vacuum measurement unit).

The on-off valve 76 is provided in each of the suction paths 73, more specifically, each of the eighth paths 737, and the on-off operation thereof is controlled by a control unit (not illustrated) of the stirring and defoaming device. When the on-off valve 76 is in a closed state, the suction path 73 is closed, air in the suction path 73 and the vacuum chamber 33 located farther cannot be sucked. On the other hand, when the on-off valve 76 is in an open state, the suction path 73 is opened, air in the suction path 73 and the vacuum chamber 33 located farther can be sucked, and the inside of the vacuum chamber 33 as well as the inside of the container 40 can be brought into a vacuum state. Then, after the inside of the vacuum chamber 33 is brought into a vacuum state, the on-off valve 76 is brought into a closed state, and the suction path 73 is closed, whereby the vacuum state in the vacuum chamber 33 can be maintained.

The open valve 77 is provided in each of the suction paths 73, more specifically, each of the eighth paths 737, on the upstream side (the container 40 side) of the on-off valve 76, and the on-off operation of the open valve 77 is controlled by a control unit (not illustrated) of the stirring and defoaming device. After the vacuum pump 72 is stopped, the inside of the vacuum chamber 33 is returned to atmospheric pressure via the suction path 73 by bringing the open valve 77 into an open state, so that the vacuum chamber 33 can be opened by removing the sealing lid 34, and the processed container 40 can be taken out.

The buffer tank 78 is provided downstream of the on-off valve 76 (between the on-off valve 76 and the vacuum pump 72), more specifically, in the ninth path 738. The buffer tank 78 can be brought into a vacuum state beforehand by bringing the on-off valve 76 into a closed state and driving the vacuum pump 72. In this state, in the case of bringing the inside of the vacuum chamber 33 into a vacuum state, air in the suction path 73 and the vacuum chamber 33 located farther is sucked by the buffer tank 78 that had been brought into a vacuum state, and the inside of the vacuum chamber 33 is brought into a vacuum state, by bringing the on-off valve 76 into an open state. Thus, the inside of the vacuum chamber 33 as well as the inside of the container 40 can be rapidly brought into a vacuum state, and exposure of the vacuum pump 72 to high pressure can be prevented.

The filter 79 is provided in each of the suction paths 73, more specifically, each of the fifth paths 734, i.e., on the upstream side (the container 40 side) of the turning joint for revolution 75. If air in the container 40 is sucked, and materials, dust, and the like spilled from the container 40 are simultaneously sucked and then enter the turning joint for revolution 75, damage or the like to a seal member of the turning joint for revolution 75 may be caused, which would then lead to deterioration of sealing performance or breakage of the turning joint for revolution 75. The filter 79 is provided to prevent this.

The vacuum gauge 80 is used to measure a vacuum state (degree of vacuum) in the container 40. The vacuum gauge 80 is a battery type or cell type having a power supply therein. Moreover, the vacuum gauge 80 has a wireless communication function compliant with wireless communication standards, including a near-field wireless communication standard such as Bluetooth (registered trademark) and ZigBee (registered trademark), a wireless LAN standard such as IEEE 802.11, an infrared communication standard such as IrDA, and can wirelessly transmit a measurement value to the control unit of the stirring and defoaming device. Thus, the vacuum gauge 80 has neither a power supply line nor a communication line, is free of the problem of a tangled line, and can be revolved and rotated together with the container 40. However, wiring from the vacuum gauge 80 to the control unit of the stirring and defoaming device is possible by suitably interposing a slip ring in a necessary part, and therefore the vacuum gauge 80 may be wired. The vacuum gauge 80 is capable of transmitting not only a degree of vacuum but also various kinds of information such as an ID of the vacuum gauge 80 (an ID of communication equipment), radio field intensity, and a remaining capacity of a battery.

Next, a stirring and defoaming method by the stirring and defoaming device having the above configuration is described. First, the number of revolution turns, the number of rotation turns, and a degree of vacuum are input to the control unit of the stirring and defoaming device by use of a user interface, according to the kind of material to be stirred and defoamed, the purpose of usage, etc. Thereafter, the material is stored in the container 40, and the container 40 is stored in the vacuum chamber 33 of the rotation body 30. When an instruction to start operation is given, the driving motor 51 is driven, thereby the revolution body 20 turns, and the container 40 revolves. Moreover, braking force of the brake device 61 is applied to the rotation body 30 via a transmission mechanism, the rotation body 30 turns relative to the revolution body 20, and the container 40 rotates. Consequently, stirring and defoaming processing is conducted for the material in the container 40 by the revolution and rotation of the container 40.

Thereafter, when the number of revolution turns and the number of rotation turns of the container 40 are each sensed by a sensor (not illustrated) and reach preset numerical values, vacuum processing (evacuation) in the vacuum chamber 33 is started. This vacuum processing is conducted for a predetermined time at a preset degree of vacuum. In other words, the container 40 turns in a constant state and a predetermined time elapses, or the container 40 reaches a constant number of turns, and at the same time, the on-off valve 76 is brought into an open state, so that the inside of the vacuum chamber 33 as well as the inside of the container 40 is brought into a vacuum state by the action of the buffer tank 78 described above. In this instance, the on-off valve 76 is on-off controlled or the number of turns of the vacuum pump 72 is controlled according to changes in the degree of vacuum resulting from defoaming, a set degree of vacuum is continuously kept in a constant state, and always constant and highly accurate stirring and defoaming processing is conducted.

The stirring and defoaming method described here is only one example. For example, vacuum processing can be started simultaneously with the start of operation of the stirring and defoaming device, rather than starting vacuum processing after starting the operation of the device, i.e., rather than delaying the start timing of vacuum processing from the start timing of the operation of the device. Moreover, even if the start timing of vacuum processing were delayed, vacuum processing could also be started by other triggers (e.g., acceleration of the container 40 measured by an acceleration sensor). Further, a selection can be made as to whether to end vacuum processing after the operation of the device is ended, i.e., delay the end timing of vacuum processing from the end timing of the operation of the device, or to end vacuum processing simultaneously with the end of the operation of the device. In this way, the stirring and defoaming device according to the present embodiment has a configuration that can individually control the number of revolution turns, the number of rotation turns, a degree of vacuum, and the actuation timing thereof, and it goes without saying that a variety of stirring and defoaming methods can be carried out based on these functions.

Embodiment 1-1

In this embodiment, as illustrated in FIG. 2, two vacuum gauges 80 are each provided in association with each of the suction paths 73, and are each arranged on an outer surface side of the sealing lid 34 of the vacuum chamber 33. In this instance, a port of the vacuum gauge 80 is positioned inside the vacuum chamber 33 through the sealing lid 34, the sealing lid 34 faces the opening 41 of the container 40, and therefore the port of the vacuum gauge 80 is located at a position near the opening 41 of the container 40. This is one pattern in which the vacuum gauge 80 is arranged at a position nearest to (the opening 41 of) the container 40.

According to this configuration, the suction paths 73 are not provided with only one common vacuum gauge 80, but each of the containers 40 is provided with the vacuum gauge 80, and therefore a vacuum state in each of the containers 40 can be accurately recognized. Moreover, the vacuum gauge 80 is provided at a position nearest to the container 40, so that a vacuum state in each of the containers 40 can be not only accurately recognized but also readily recognized with no time difference.

Moreover, according to this configuration, each of the suction paths 73 is substantially independent, and thereby the vacuum means 70 is substantially independently provided for each of the containers 40, so that a wide variety of stirring and defoaming processing can be simultaneously conducted with one stirring and defoaming device, by suitably combining control of driving/stopping the vacuum pump 72 with on-off control of each of the on-off valves 76, and/or by storing different kinds of materials in each of the containers 40.

When there are a plurality of containers 40, a degree of vacuum may differ in each of the containers 40, or a difference in the time to reach a set degree of vacuum may occur. This is caused by, for example, the difference in the amount (processing amount) of a material stored in each of the containers 40, or storage of different kinds of materials (heterogeneous materials) stored in each of the containers 40. According to Embodiment 1-1, the vacuum gauge 80 is provided for each of the containers 40, so that a vacuum state in each of the containers 40 can be accurately recognized, thus enabling appropriate management and/or control of a vacuum state.

Moreover, in the case of providing only one common vacuum gauge 80 for the suction paths 73, there is concern that if a reduction of the vacuum in the container 40 were to occur due to clogging or leakage occurring in the suction path 73 of any of the containers 40, this would not be found by one vacuum gauge 80. According to Embodiment 1-1, the vacuum gauge 80 is provided for each of the containers 40, so that a vacuum state in each of the containers 40 can be accurately recognized, thus enabling appropriate management and/or control of a vacuum state.

Moreover, in the case of vacuum processing that is not a vacuum chamber type but that uses a suction path, the problem of pressure loss resulting from a caliber change in the suction path or the path length may arise. Particularly as the stirring and defoaming device becomes larger, there is concern that this problem might be more apparent. The problem of a time difference resulting from the path length can also arise. According to Embodiment 1-1, the vacuum gauge 80 is provided at a position nearest to the container 40, so that a vacuum state in each of the containers 40 can be accurately and readily recognized with no time difference, thus enabling appropriate management and/or control of a vacuum state.

In a small stirring and defoaming device, the weight of the vacuum gauge 80 for the device element related to rotation is not negligible, and it is preferable that the vacuum gauge 80 be arranged on the central side of the sealing lid 34 as much as possible in order to perform a smooth rotational movement. However, as the stirring and defoaming device becomes larger, the weight of the vacuum gauge 80 becomes more negligible, and there is therefore no problem in arranging the vacuum gauge 80 at a position off the center of the sealing lid 34.

However, when arranged in a peripheral part of the sealing lid 34, the vacuum gauge 80 becomes nearer to the first end of the first path 730 of the suction path 73 opening in the inner surface of the peripheral wall portion 32 of the vacuum chamber 33. When placed in the vicinity of the first end, i.e., in the vicinity of a suction hole from the suction path 73, the vacuum gauge 80 is subject to a local pressure fluctuation. It is preferable to avoid such a local pressure fluctuation from the perspective of recognizing a degree of vacuum in the container 40. Thus, it is preferable that the vacuum gauge 80 be arranged at a position avoiding the first end of the first path 730 and a certain distance away from the first end. However, in the case of a structure of the sealing lid 34 whose mounting angle to the axis of the rotation body 30 is not determinate, it is troublesome or difficult to mount the sealing lid 34 in such a way that the vacuum gauge 80 is located at a position a certain distance away from the first end of the first path 730. Thus, in consideration of the above, it is preferable to arrange the vacuum gauge 80 in the central region 34a represented by the hatching within the dashed frame, and exclude the outer peripheral part 34b of the sealing lid 34, as illustrated in FIGS. 22A to 22D.

Figure 22A:
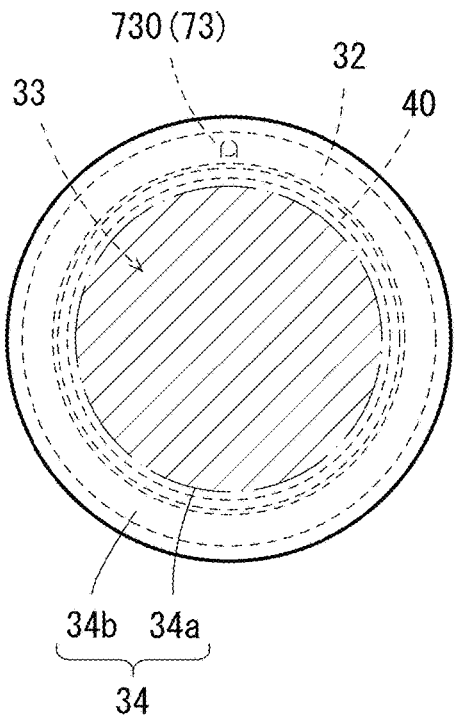
FIGS. 22A to 22D are explanatory views of the stirring and defoaming devices according to Embodiments 1-1, 1-2, and 1-5 to 1-7, Embodiments 2-1, 2-2, 2-4, and 2-5, and Embodiments 3-1 and 3-2, regarding a preferred arrangement region of a vacuum measurement unit in a sealing lid mounted to a rotation body.
Figure 22B:
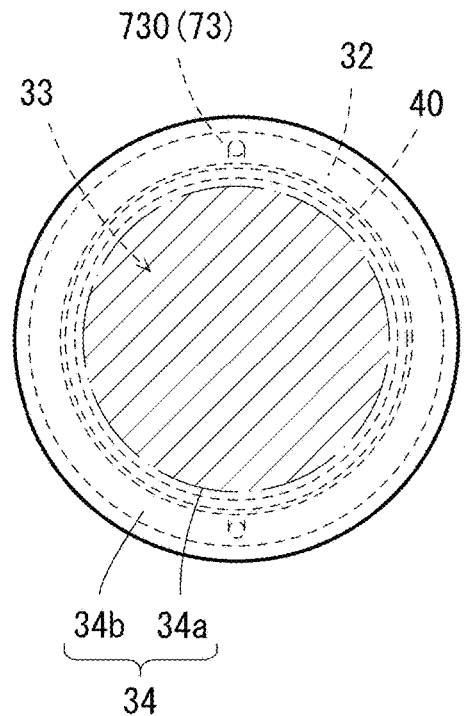
Figure 22C:
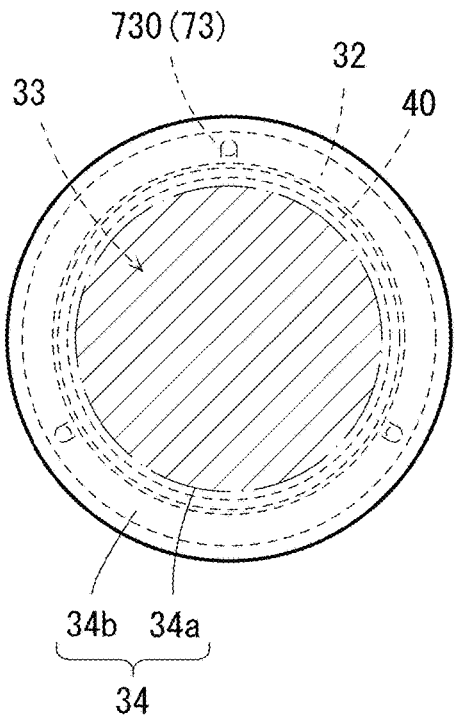
Figure 22D:
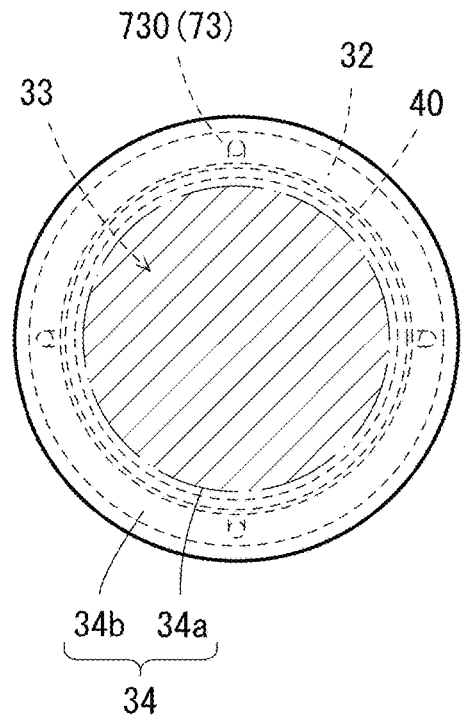

FIG. 22A is an example in which only one first path 730 is provided, and only one first end is open in the inner surface of the peripheral wall portion 32 of the vacuum chamber 33; FIG. 22B is an example in which two first paths 730 are provided, and two first ends are open at two peripheral places (e.g., equally divided two places) in the inner surface of the peripheral wall portion 32; FIG. 22C is an example in which three first paths 730 are provided, and three first ends are open at three peripheral places (e.g., equally divided three places) in the inner surface of the peripheral wall portion 32; and FIG. 22D is an example in which four first paths 730 are provided, and four first ends are open at four peripheral places (e.g., equally divided four places) in the inner surface of the peripheral wall portion 32.

Embodiment 1-2

Figure 3:
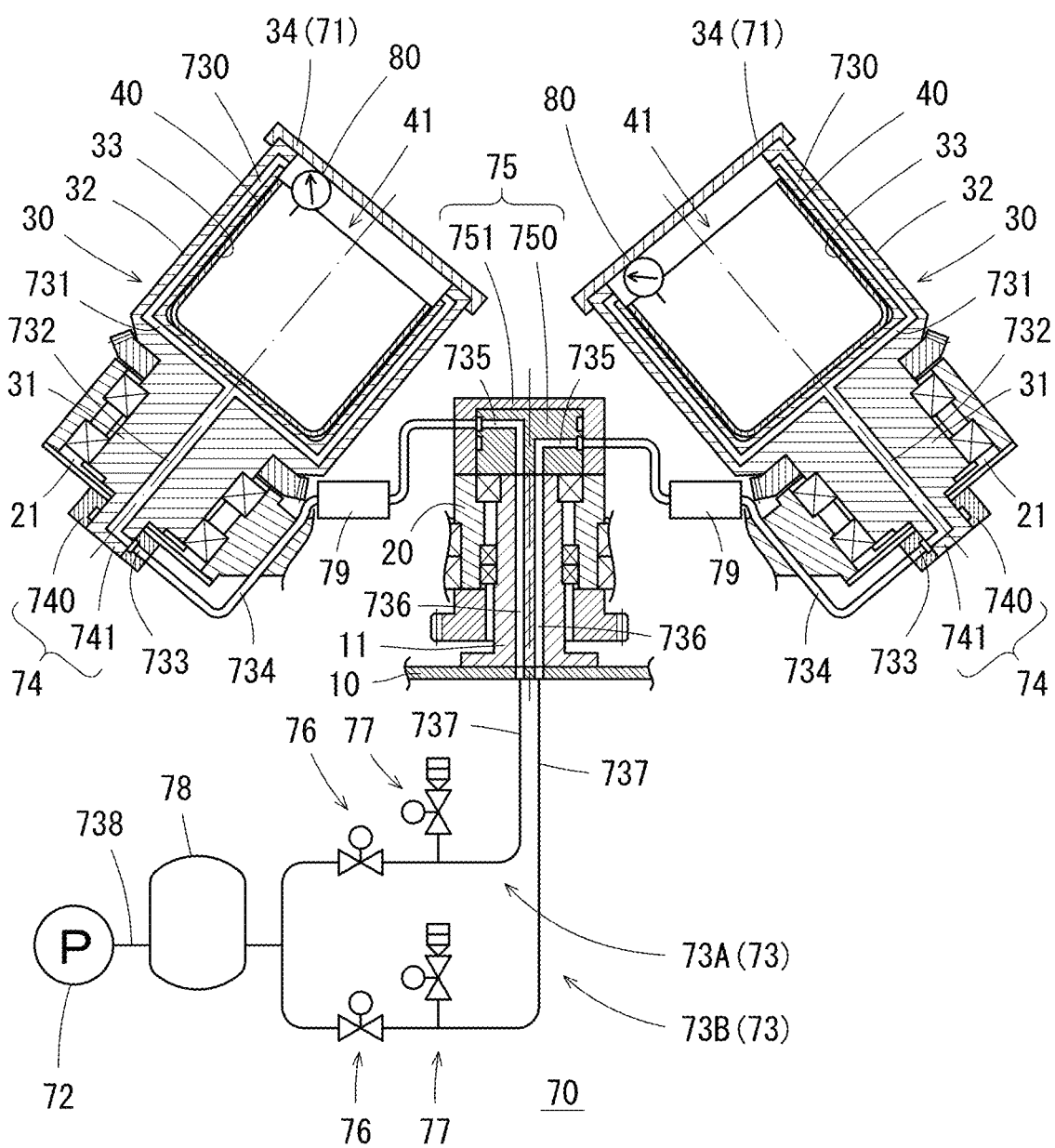
FIG. 3 is a chief part sectional view of a stirring and defoaming device according to Embodiment 1-2.

In this embodiment, as illustrated in FIG. 3, two vacuum gauges 80 are each provided in association with each of the suction paths 73, and are each arranged on an inner surface side of the sealing lid 34 of the vacuum chamber 33. A port of the vacuum gauge 80 is positioned inside the vacuum chamber 33, and is located at a position near the opening 41 of the container 40. This is another pattern in which the vacuum gauge 80 is arranged at a position nearest to (the opening 41 of) the container 40.

According to this configuration as well, as in Embodiment 1-1, the suction paths 73 are not provided with only one common vacuum gauge 80, but each of the containers 40 is provided with the vacuum gauge 80, and therefore a vacuum state in each of the containers 40 can be accurately recognized. Moreover, the vacuum gauge 80 is provided at a position nearest to the container 40, so that a vacuum state in each of the containers 40 can be not only accurately recognized but also readily recognized with no time difference.

Moreover, according to this configuration as well, as in Embodiment 1-1, each of the suction paths 73 is substantially independent, and thereby the vacuum means 70 is substantially independently provided for each of the containers 40, so that a wide variety of stirring and defoaming processing can be simultaneously conducted with one stirring and defoaming device, by suitably combining control of driving/stopping the vacuum pump 72 with on-off control of each of the on-off valves 76, and/or by storing different kinds of materials in each of the containers 40.

Embodiment 1-3

Figure 4:
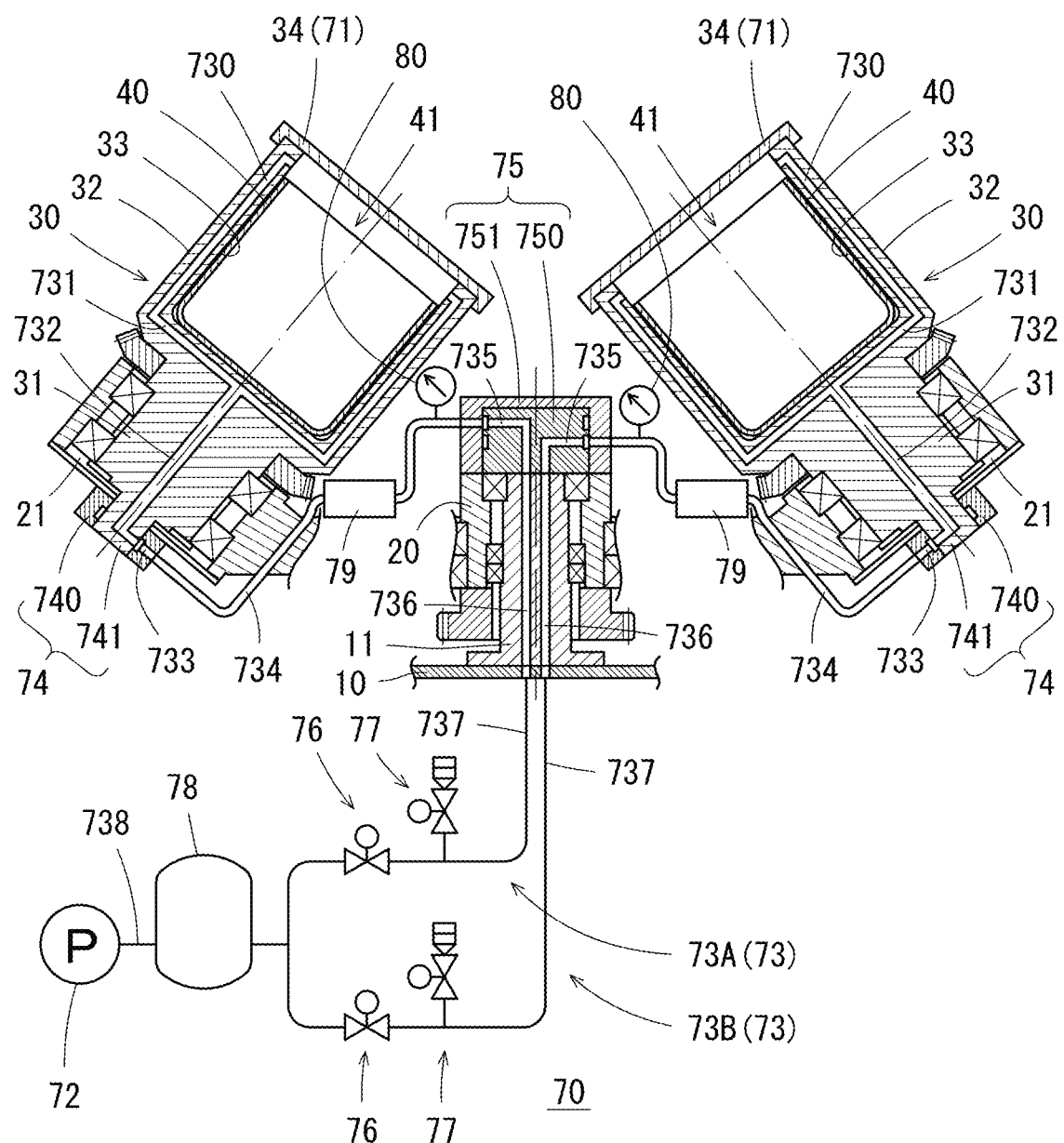
FIG. 4 is a chief part sectional view of a stirring and defoaming device according to Embodiment 1-3.

In this embodiment, as illustrated in FIG. 4, two vacuum gauges 80 are each provided in association with each of the suction paths 73, and are each arranged in the suction path 73 exiting from the rotation body 30 to reach the revolution center, i.e., the suction path 73 between the turning joint for rotation 74 and the turning joint for revolution 75, i.e., the fifth path 734. The vacuum gauges 80 may be each arranged in the fourth path 733.

According to this configuration as well, as in Embodiment 1-1, the suction paths 73 are not provided with only one common vacuum gauge 80, but each of the containers 40 is provided with the vacuum gauge 80, and therefore a vacuum state in each of the containers 40 can be accurately recognized. Moreover, the position of the vacuum gauge 80 is farther from the container 40 than in Embodiment 1-1, nevertheless the vacuum gauge 80 is provided at a position near the container 40, so that a vacuum state in each of the containers 40 can be not only accurately recognized but also readily recognized with no time difference.

Moreover, according to this configuration as well, as in Embodiment 1-1, each of the suction paths 73 is substantially independent, and thereby the vacuum means 70 is substantially independently provided for each of the containers 40, so that a wide variety of stirring and defoaming processing can be simultaneously conducted with one stirring and defoaming device, by suitably combining control of driving/stopping the vacuum pump 72 with on-off control of each of the on-off valves 76, and/or by storing different kinds of materials in each of the containers 40.

Embodiment 1-4

Figure 5:
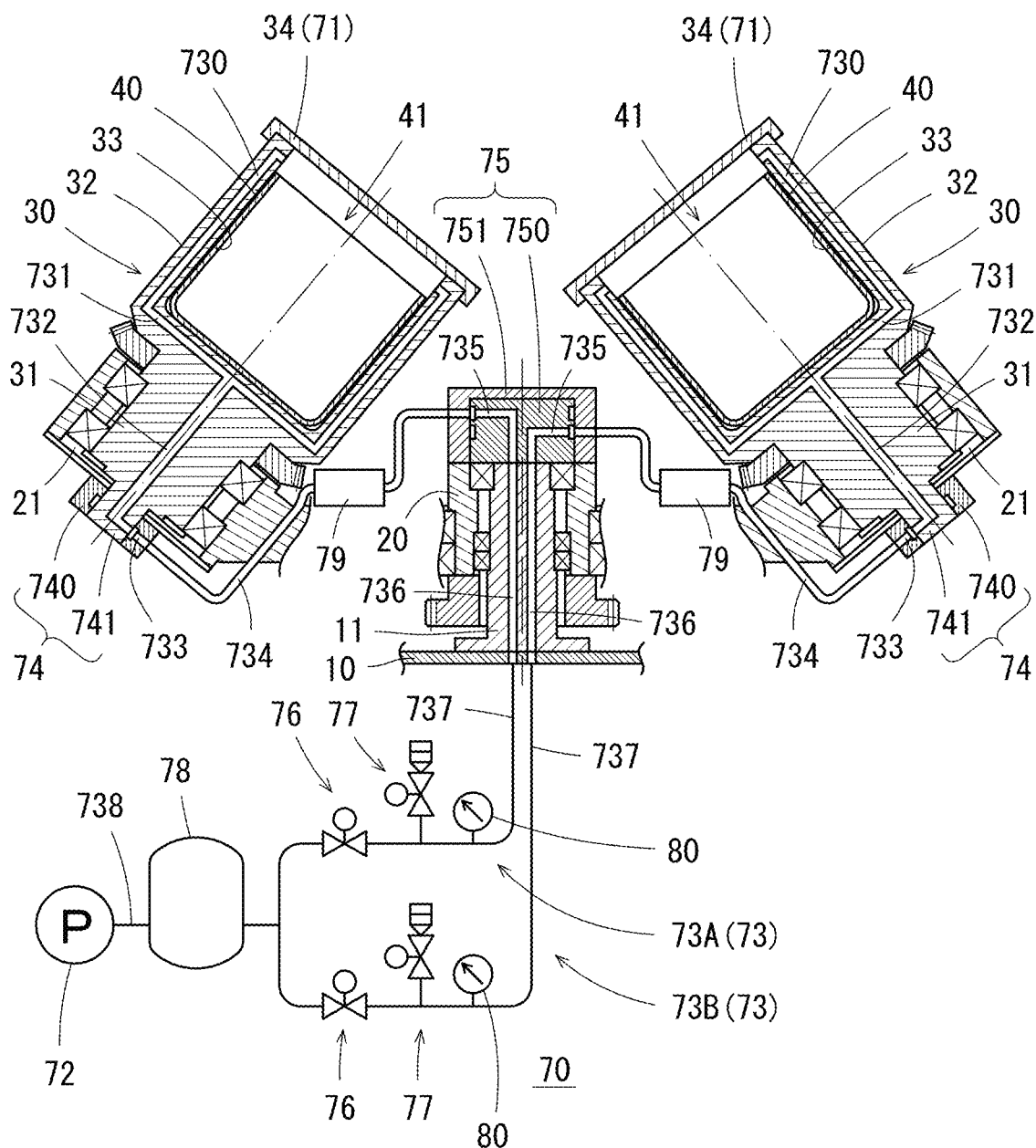
FIG. 5 is a chief part sectional view of a stirring and defoaming device according to Embodiment 1-4.

In this embodiment, as illustrated in FIG. 5, two vacuum gauges 80 are each provided in association with each of the suction paths 73, and are each arranged in the suction path 73 exiting from the revolution center to reach the vacuum pump 72, i.e., the suction path 73 outside the system, i.e., the eighth path 737 or the ninth path 738.

According to this configuration as well, as in Embodiment 1-1, the suction paths 73 are not provided with only one common vacuum gauge 80, but each of the containers 40 is provided with the vacuum gauge 80, and therefore a vacuum state in each of the containers 40 can be accurately recognized.

Moreover, according to this configuration as well, as in Embodiment 1-1, each of the suction paths 73 is substantially independent, and thereby the vacuum means 70 is substantially independently provided for each of the containers 40, so that a wide variety of stirring and defoaming processing can be simultaneously conducted with one stirring and defoaming device, by suitably combining control of driving/stopping the vacuum pump 72 with on-off control of each of the on-off valves 76, and/or by storing different kinds of materials in each of the containers 40.

Embodiment 1-5

Figure 6:
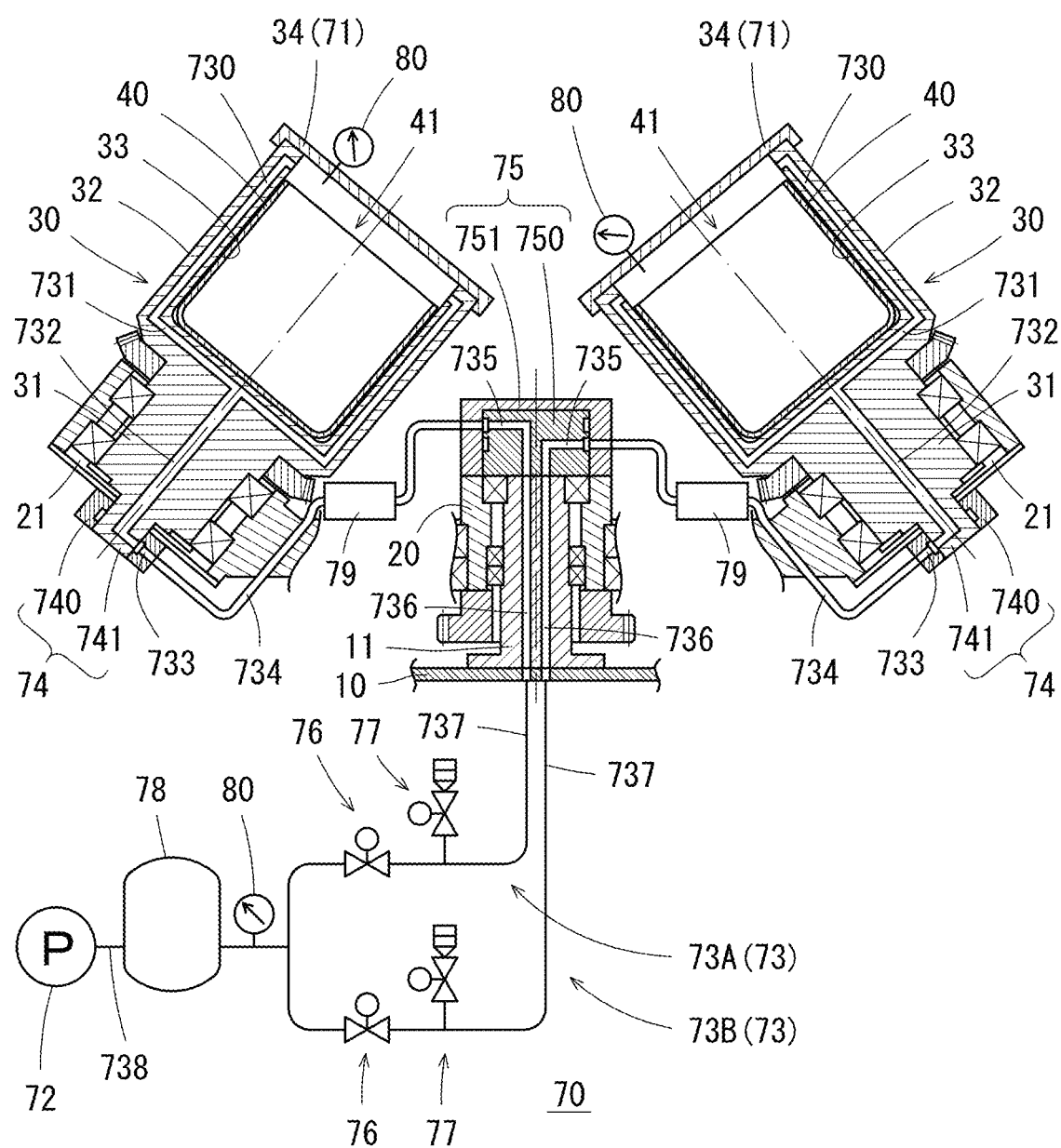
FIG. 6 is a chief part sectional view of a stirring and defoaming device according to Embodiment 1-5.

In this embodiment, as illustrated in FIG. 6, two vacuum gauges 80 are each provided in association with each of the suction paths 73, and are not only each arranged as in any of Embodiments 1-1 to 1-3, and but also arranged near the vacuum pump 72, i.e., in the ninth path 738.

According to this configuration as well, as in Embodiment 1-1, the suction paths 73 are not provided with only one common vacuum gauge 80, but each of the containers 40 is provided with the vacuum gauge 80, and therefore a vacuum state in each of the containers 40 can be accurately recognized. Moreover, the vacuum gauge 80 is provided at a position nearest to the container 40, so that a vacuum state in each of the containers 40 can be not only accurately recognized but also readily recognized with no time difference. Moreover, in addition to the above, since the vacuum gauge 80 is also provided at a position near the container 40, the operation status (degree of vacuum) of the vacuum pump 72 can be accurately recognized, and if a reduction of the vacuum in the container 40 were to occur, this could be certainly found (sensed) by comparing the operation status with a measurement value by the vacuum gauge 80 provided at a position near the container 40.

Moreover, according to this configuration as well, as in Embodiment 1-1, each of the suction paths 73 is substantially independent, and thereby the vacuum means 70 is substantially independently provided for each of the containers 40, so that a wide variety of stirring and defoaming processing can be simultaneously conducted with one stirring and defoaming device, by suitably combining control of driving/stopping the vacuum pump 72 with on-off control of each of the on-off valves 76, and/or by storing different kinds of materials in each of the containers 40.

Embodiment 1-6

Figure 7:
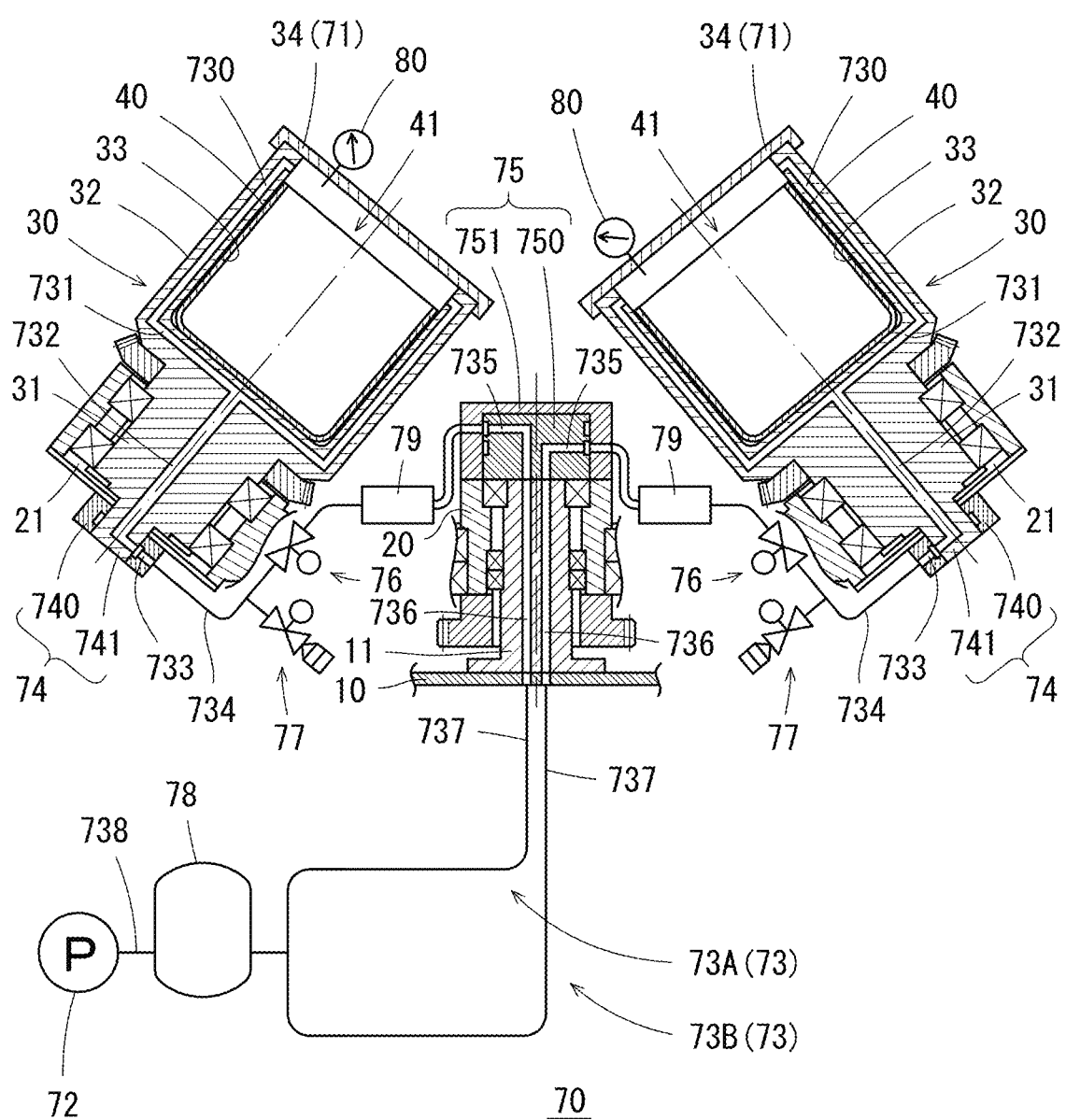
FIG. 7 is a chief part sectional view of a stirring and defoaming device according to Embodiment 1-6.

This embodiment is basically the same as any of Embodiments 1-1 to 1-5, but is different therefrom in that the on-off valve 76 and the open valve 77 are each arranged in the suction path 73 exiting from the rotation body 30 to reach the revolution center, i.e., the suction path 73 between the turning joint for rotation 74 and the turning joint for revolution 75, i.e., the fifth path 734, as illustrated in FIG. 7, instead of being each arranged in the suction path 73 exiting from the revolution center to reach the vacuum pump 72, i.e., the suction path 73 outside the system, i.e., the eighth path 737, as in Embodiments 1-1 to 1-5.

According to this configuration as well, as in Embodiment 1-1, the suction paths 73 are not provided with only one common vacuum gauge 80, but each of the containers 40 is provided with the vacuum gauge 80, and therefore a vacuum state in each of the containers 40 can be accurately recognized. Moreover, the vacuum gauge 80 is provided at a position nearest to the container 40, so that a vacuum state in each of the containers 40 can be not only accurately recognized but also readily recognized with no time difference. Moreover, in addition to the above, since the on-off valve 76 and the open valve 77 are provided at positions near the container 40, vacuum processing can be accelerated.

Moreover, according to this configuration as well, as in Embodiment 1-1, each of the suction paths 73 is substantially independent, and thereby the vacuum means 70 is substantially independently provided for each of the containers 40, so that a wide variety of stirring and defoaming processing can be simultaneously conducted with one stirring and defoaming device, by suitably combining control of driving/stopping the vacuum pump 72 with on-off control of each of the on-off valves 76, and/or by storing different kinds of materials in each of the containers 40.

Embodiment 1-7

Figure 8:
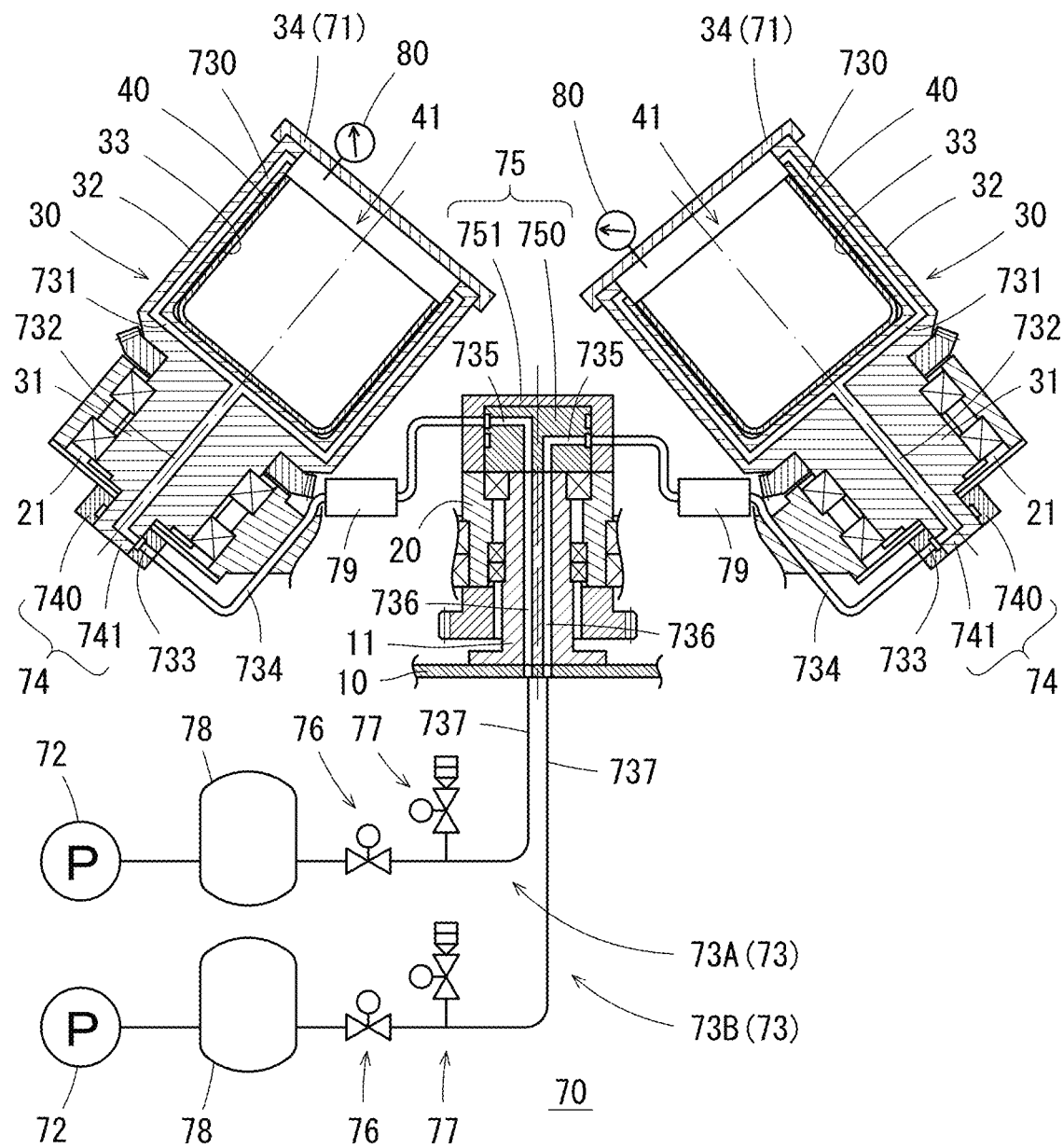
FIG. 8 is a chief part sectional view of a stirring and defoaming device according to Embodiment 1-7.

This embodiment is basically the same as any of Embodiments 1-1 to 1-6, but is different therefrom in that both of the suction paths 73, 73 are not provided with only one common vacuum pump 72, but each of the suction paths 73 is provided with the vacuum pump 72, as illustrated in FIG. 8. Therefore, in this embodiment, not the ninth path 738 but the second end of each of the eighth paths 737 is connected to each of the vacuum pumps 72.

According to this configuration as well, as in Embodiment 1-1, the suction paths 73 are not provided with only one common vacuum gauge 80, but each of the containers 40 is provided with the vacuum gauge 80, and therefore a vacuum state in each of the containers 40 can be accurately recognized. Moreover, the vacuum gauge 80 is provided at a position nearest to the container 40, so that a vacuum state in each of the containers 40 can be not only accurately recognized but also readily recognized with no time difference.

Moreover, according to this configuration, each of the suction paths 73 is completely independent, and thereby the vacuum means 70 is completely independently provided for each of the containers 40, so that a wide variety of stirring and defoaming processing can be simultaneously conducted with one stirring and defoaming device, by suitably combining control of driving/stopping each of the vacuum pumps 72, on-off control of each of the on-off valves 76, and furthermore, control of output of each of the vacuum pumps 72, and/or by storing different kinds of materials in each of the containers 40.

The vacuum means 70 is completely independently provided for each of the containers 40, and this alone enables fully appropriate management and/or control of a vacuum state. Thus, this also enables providing no vacuum gauge 80.

Embodiment 1-8

Figure 9:
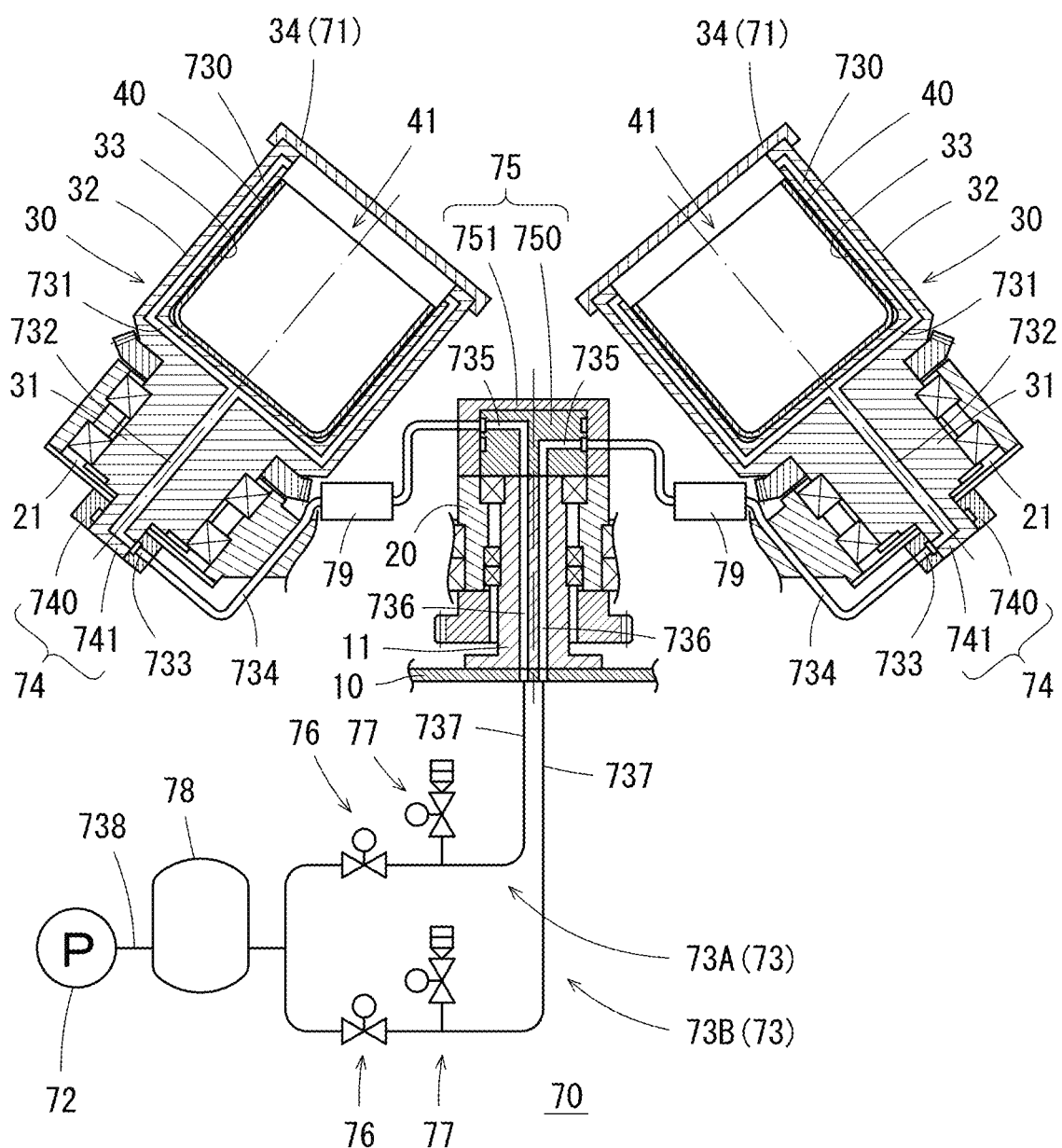
FIG. 9 is a chief part sectional view of a stirring and defoaming device according to Embodiment 1-8.

In this embodiment, as illustrated in FIG. 9, no vacuum gauge 80 is provided. In other respects, this embodiment is the same as any of Embodiments 1-1 to 1-7.

According to this configuration as well, as in Embodiment 1-1, each of the suction paths 73 is substantially independent, and thereby the vacuum means 70 is substantially independently provided for each of the containers 40, so that a wide variety of stirring and defoaming processing can be simultaneously conducted with one stirring and defoaming device, by suitably combining control of driving/stopping the vacuum pump 72 with on-off control of each of the on-off valves 76, and/or by storing different kinds of materials in each of the containers 40.

The vacuum means 70 is completely independently provided for each of the containers 40, and this alone enables fully appropriate management and/or control of a vacuum state. Thus, this also enables providing no vacuum gauge 80.

Embodiment 2

Figure 10A:
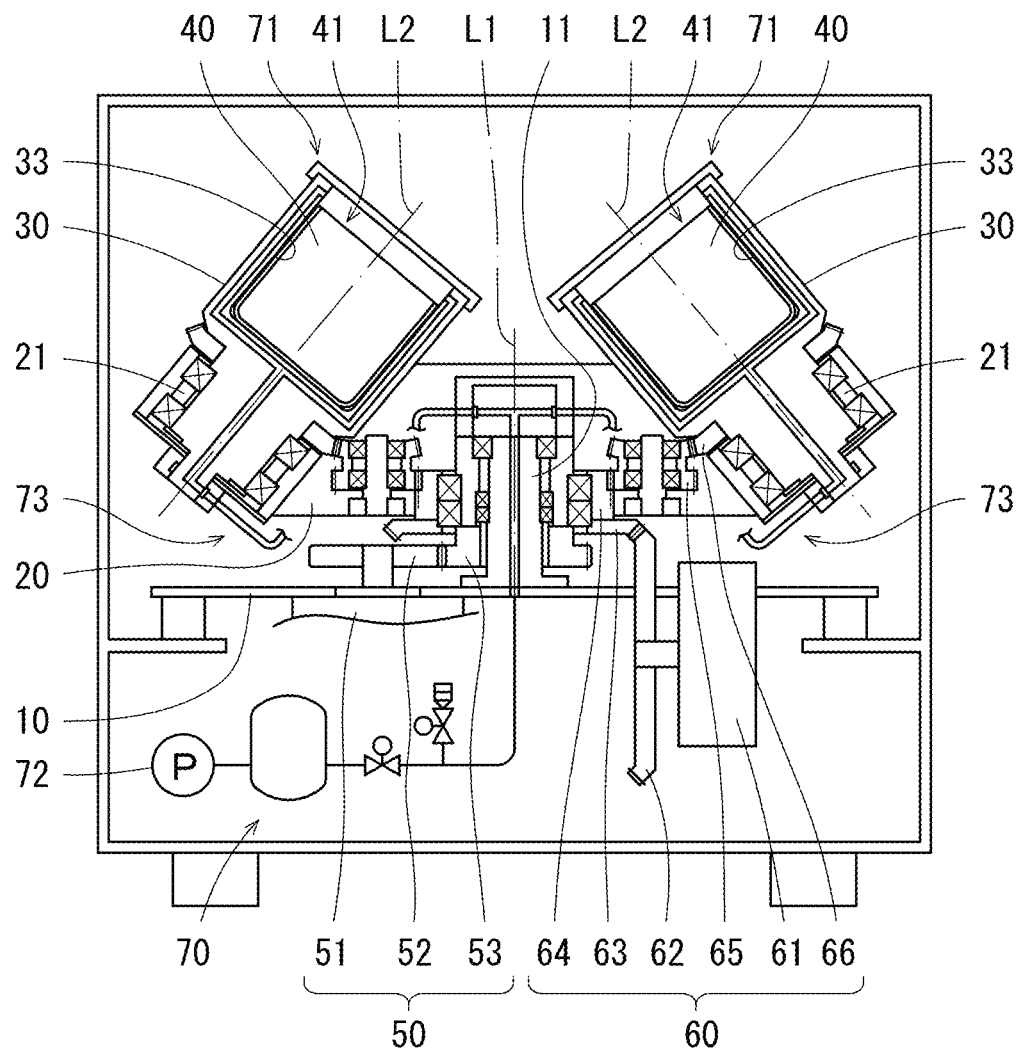
FIG. 10A is a sectional view of a stirring and defoaming device according to Embodiment 2.
Figure 10B:
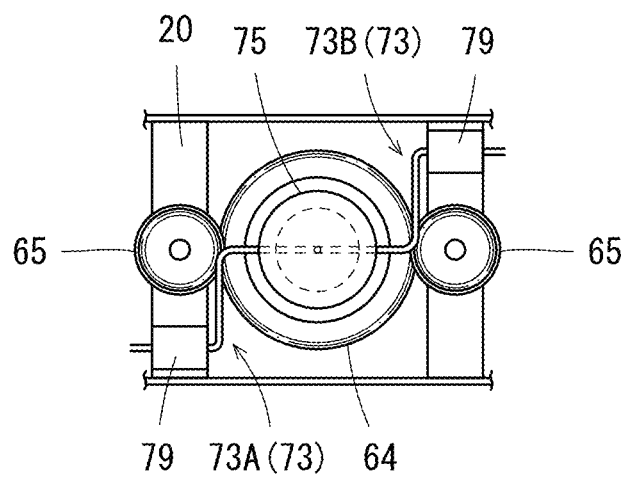
FIG. 10B is a partial top view of the stirring and defoaming device.

Hereinafter, Embodiment 2 of a stirring and defoaming device according to the present invention is described with reference to FIGS. 10A, 108 and 11. This embodiment is basically the same as Embodiment 1, but is different therefrom in that suction paths 73, 73 merge halfway.

Specifically,
the suction path 73 is composed of
i) a first path 730 having a first end opening in an inner surface of a peripheral wall portion 32 of a vacuum chamber 33, opening in the vacuum chamber 33, and passing through the inside of the peripheral wall portion 32 of the vacuum chamber 33, and a second end reaching a bottom portion of the vacuum chamber 33,
ii) a second path 731 having a first end connected to the second end of the first path 730 and passing through the inside of the bottom portion of the vacuum chamber 33, and a second end reaching a rotation center at the bottom portion of the vacuum chamber 33,
iii) a third path 732 having a first end connected to the second end of the second path 731 and passing through the inside of a rotation body main portion 31, and a second end reaching an end (a lower end in the present embodiment) opposite the tip of the rotation body main portion 31,
iv) a fourth path 733 having a first end connected to the second end of the third path 732 and passing through the inside of a turning joint for rotation 74 provided at the opposite end of the rotation body main portion 31, and a second end reaching an outer surface of the turning joint for rotation 74,
v) a fifth path 734 having a first end connected to the second end of the fourth path 733 and running toward a revolution center of a revolution body 20, and a second end reaching an outer surface of a turning joint for revolution 75 provided at a tip (an upper end in the present embodiment) of a revolution shaft 11, vi) a sixth path 735 having a first end connected to the second end of the fifth path 734 and passing through the inside of the turning joint for revolution 75, and a second end reaching a joint surface of the turning joint for revolution 75 to the revolution shaft 11, vii) a seventh path 736 having a first end connected to the second end of the sixth path 735, passing through the inside of the revolution shaft 11, and passing through a base 10, and a second end reaching the outside of the system (a region outside the system as a movable region of device elements related to revolution and rotation, i.e., a region that does not interfere with movable device elements; in the present embodiment, a region below the base 10), and viii) an eighth path 737 having a first end connected to the second end of the seventh path 736, and a second end connected to a vacuum pump 72.

One suction path 73 for one container 40 of the two containers 40, 40, and another suction path 73 for the other container 40 are independent paths from the first path 730 to the fifth path 734, but merge in the turning joint for revolution 75, i.e., the sixth path 735, and become a merged path up to the eighth path 737.

Embodiment 2-1

Figure 11:
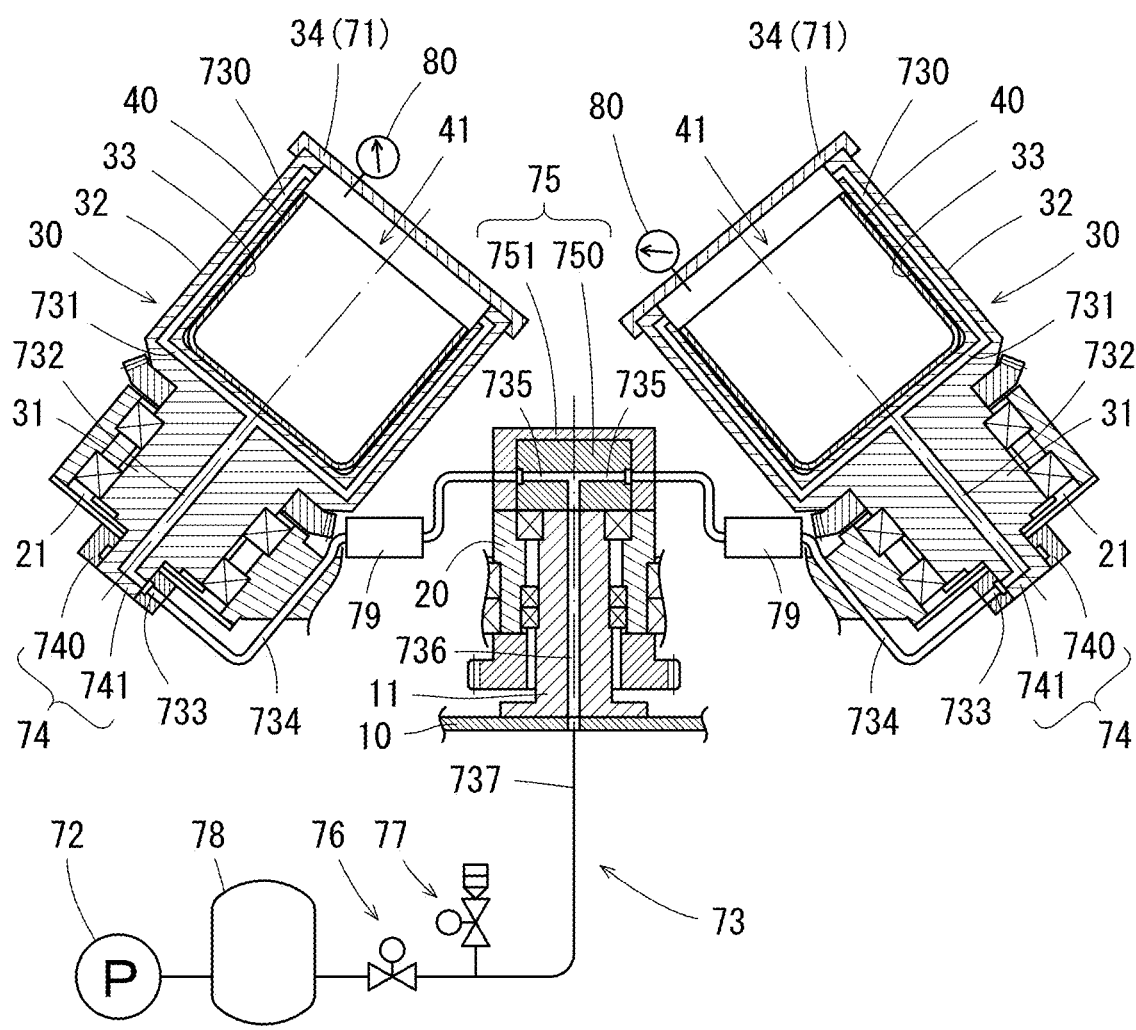
FIG. 11 is a chief part sectional view of a stirring and defoaming device according to Embodiment 2-1.

In this embodiment, as illustrated in FIG. 11, two vacuum gauges 80 are each provided in association with each of the suction paths 73 before merging, and are each arranged on an outer surface side of a sealing lid 34 of the vacuum chamber 33. In this instance, a port of the vacuum gauge 80 is positioned inside the vacuum chamber 33 through the sealing lid 34, the sealing lid 34 faces an opening 41 of the container 40, and therefore the port of the vacuum gauge 80 is located at a position near the opening 41 of the container 40. This is one pattern in which the vacuum gauge 80 is arranged at a position nearest to (the opening 41 of) the container 40.

According to this configuration, as in Embodiment 1-1, the suction paths 73 are not provided with only one common vacuum gauge 80, but each of the containers 40 is provided with the vacuum gauge 80, and therefore a vacuum state in each of the containers 40 can be accurately recognized. Moreover, the vacuum gauge 80 is provided at a position nearest to the container 40, so that a vacuum state in each of the containers 40 can be not only accurately recognized but also readily recognized with no time difference.

Embodiment 2-2

Figure 12:
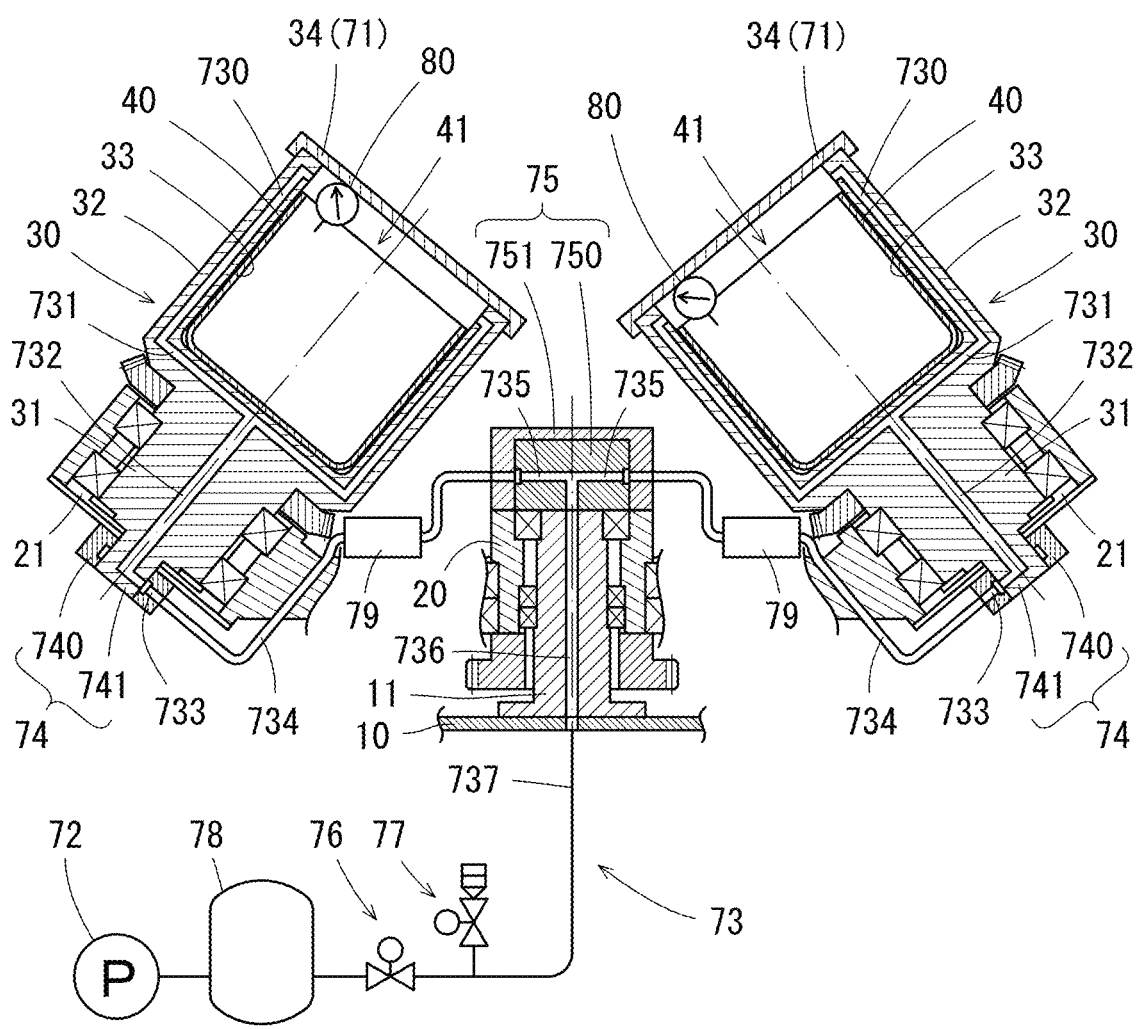
FIG. 12 is a chief part sectional view of a stirring and defoaming device according to Embodiment 2-2.

In this embodiment, as illustrated in FIG. 12, two vacuum gauges 80 are each provided in association with each of the suction paths 73 before merging, and each are arranged on an inner surface side of the sealing lid 34 of the vacuum chamber 33. A port of the vacuum gauge 80 is positioned inside the vacuum chamber 33, and is located at a position near the opening 41 of the container 40. This is another pattern in which the vacuum gauge 80 is arranged at a position nearest to (the opening 41 of) the container 40.

According to this configuration as well, as in Embodiment 2-1, the suction paths 73 are not provided with only one common vacuum gauge 80, but each of the containers 40 is provided with the vacuum gauge 80, and therefore a vacuum state in each of the containers 40 can be accurately recognized. Moreover, the vacuum gauge 80 is provided at a position nearest to the container 40, so that a vacuum state in each of the containers 40 can be not only accurately recognized but also readily recognized with no time difference.

Embodiment 2-3

Figure 13:
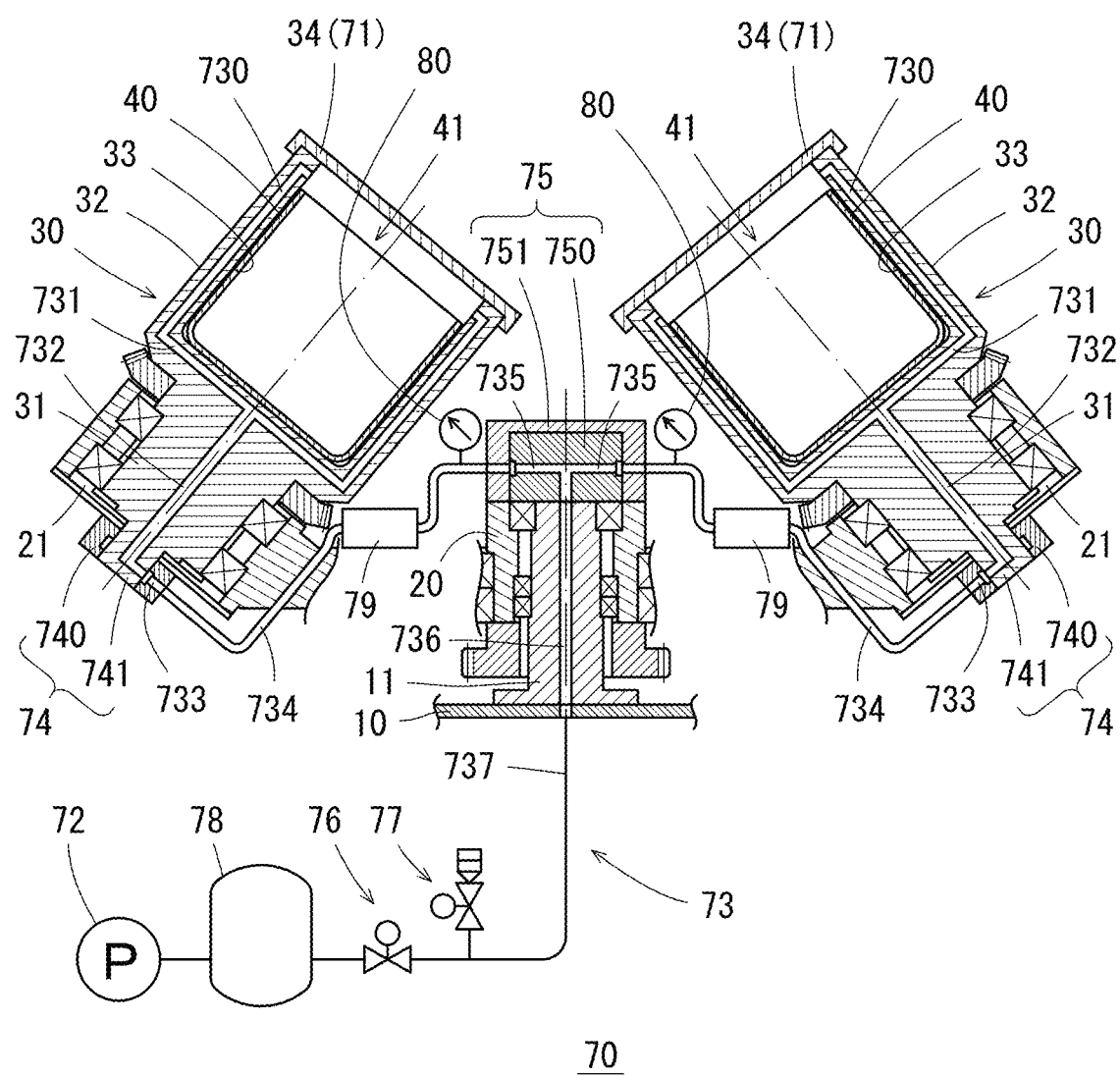
FIG. 13 is a chief part sectional view of a stirring and defoaming device according to Embodiment 2-3.

In this embodiment, as illustrated in FIG. 13, two vacuum gauges 80 are each provided in association with each of the suction paths 73 before merging, and each arranged in the suction path 73 exiting from the rotation body 30 to reach the revolution center, i.e., the suction path 73 between the turning joint for rotation 74 and the turning joint for revolution 75, i.e., the fifth path 734. The vacuum gauges 80 may be each arranged in the fourth path 733.

According to this configuration as well, as in Embodiment 2-1, the suction paths 73 are not provided with only one common vacuum gauge 80, but each of the containers 40 is provided with the vacuum gauge 80, and therefore a vacuum state in each of the containers 40 can be accurately recognized. Moreover, the position of the vacuum gauge 80 is farther from the container 40 than in Embodiment 1-1, nevertheless the vacuum gauge 80 is provided at a position near the container 40, so that a vacuum state in each of the containers 40 can be not only accurately recognized but also readily recognized with no time difference.

Embodiment 2-4

Figure 14:
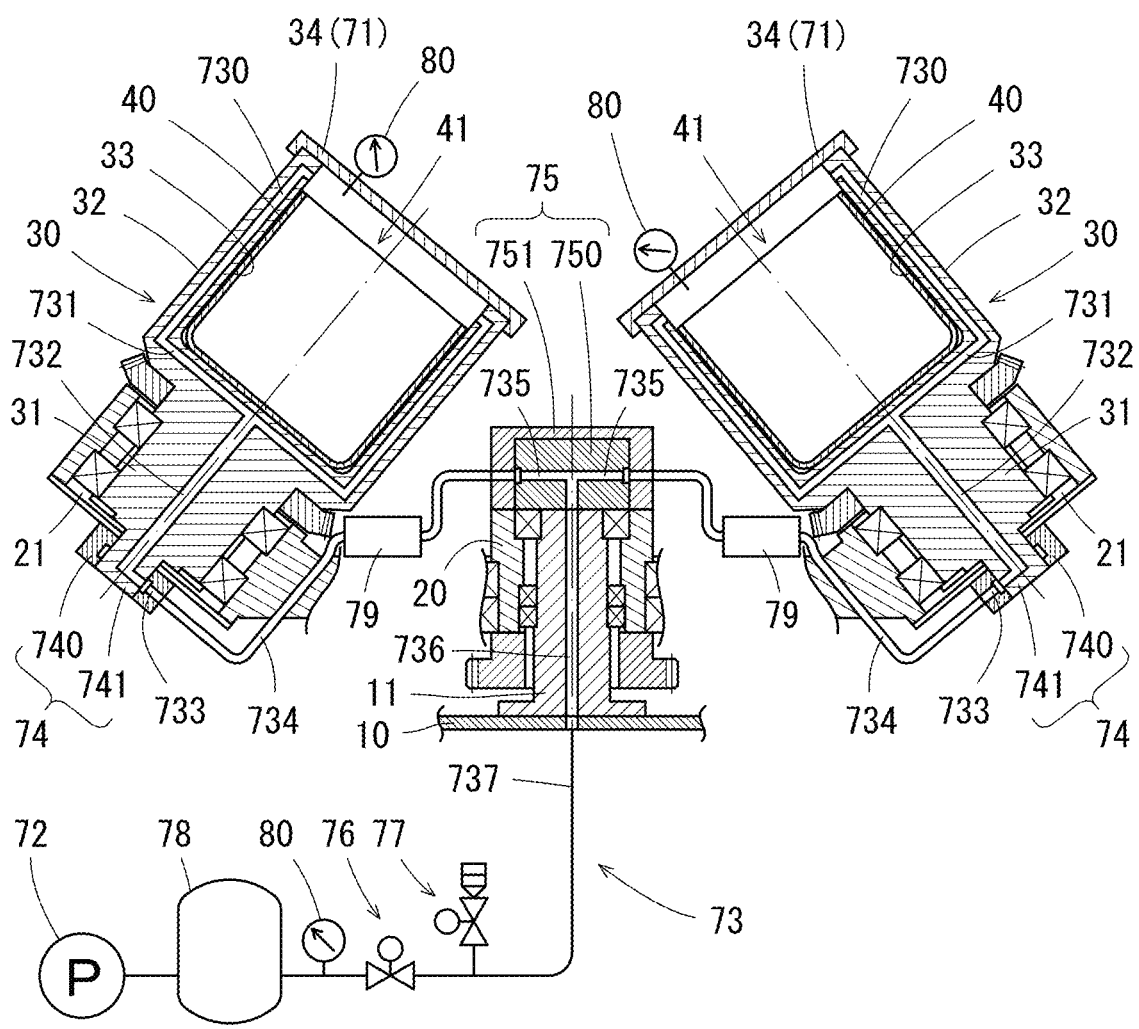
FIG. 14 is a chief part sectional view of a stirring and defoaming device according to Embodiment 2-4.

In this embodiment, as illustrated in FIG. 14, two vacuum gauges 80 are each provided in association with each of the suction paths 73 before merging, each arranged as in any of Embodiments 2-1 to 2-3, and also arranged near the vacuum pump 72, i.e., the eighth path 737.

According to this configuration as well, as in Embodiment 2-1, the suction paths 73 are not provided with only one common vacuum gauge 80, but each of the containers 40 is provided with the vacuum gauge 80, and therefore a vacuum state in each of the containers 40 can be accurately recognized. Moreover, the vacuum gauge 80 is provided at a position nearest to the container 40, so that a vacuum state in each of the containers 40 can be not only accurately recognized but also readily recognized with no time difference. Moreover, in addition to the above, since the vacuum gauge 80 is also provided at a position near the vacuum pump 72, the operation status (degree of vacuum) of the vacuum pump 72 can be accurately recognized, and if a reduction of the vacuum were to occur in the container 40, this could be certainly found (sensed) by comparing the operation status with a measurement value by the vacuum gauge 80 provided at a position near the container 40.

Embodiment 2-5

Figure 15:
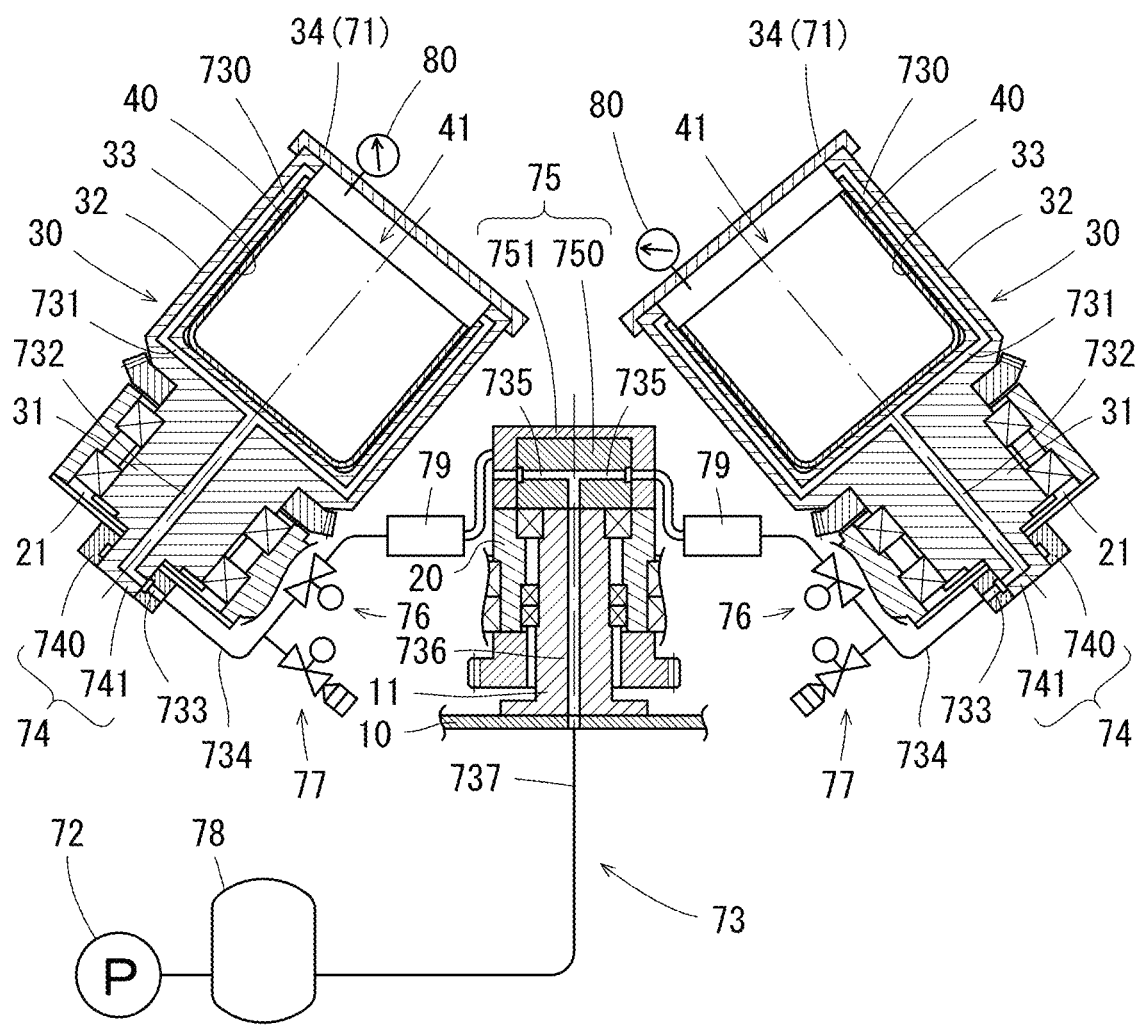
FIG. 15 is a chief part sectional view of a stirring and defoaming device according to Embodiment 2-5.

This embodiment is basically the same as any of Embodiments 2-1 to 2-4, but is different therefrom in that an on-off valve 76 and an open valve 77 are each arranged in the suction path 73 exiting from the rotation body 30 to reach the revolution center, i.e., the suction path 73 between the turning joint for rotation 74 and the turning joint for revolution 75, i.e., the fifth path 734, as illustrated in FIG. 15, instead of being each arranged in the suction path 73 exiting from the revolution center to reach the vacuum pump 72, i.e., the suction path 73 outside the system, i.e., the eighth path 737, as in Embodiments 2-1 to 2-4.

According to this configuration as well, as in Embodiment 2-1, the suction paths 73 are not provided with only one common vacuum gauge 80, but each of the containers 40 is provided with the vacuum gauge 80, and therefore a vacuum state in each of the containers 40 can be accurately recognized. Moreover, the vacuum gauge 80 is provided at a position nearest to the container 40, so that a vacuum state in each of the containers 40 can be not only accurately recognized but also readily recognized with no time difference. Moreover, in addition to the above, since the on-off valve 76 and the open valve 77 are provided at positions near the container 40, vacuum processing can be accelerated.

Embodiment 2-6

Figure 16:
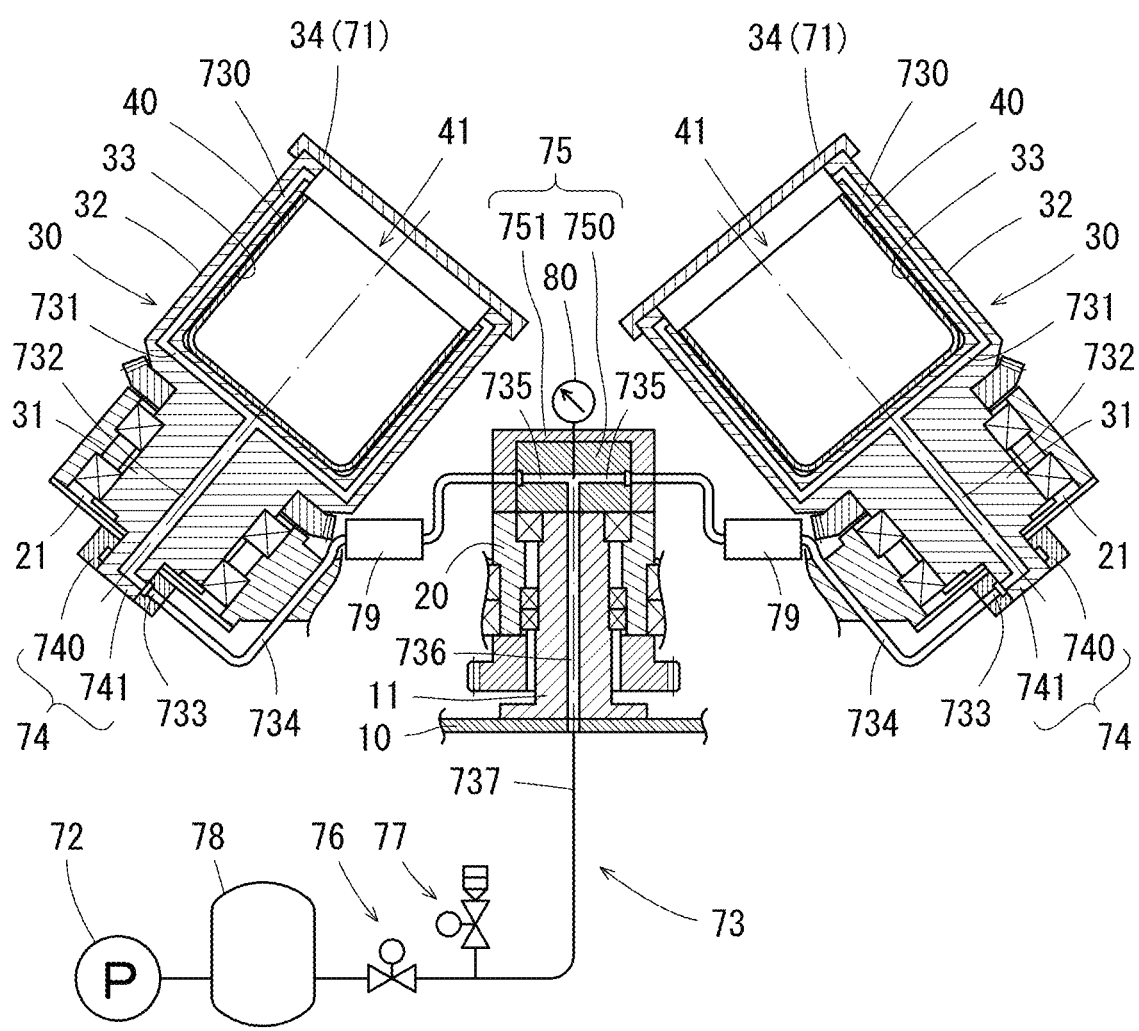
FIG. 16 is a chief part sectional view of a stirring and defoaming device according to Embodiment 2-6.

In this embodiment, as illustrated in FIG. 16, one vacuum gauge 80 is provided in accordance with both of the suction paths 73, 73 that have merged, and the vacuum gauge 80 is also arranged at a merging point of both of the suction paths 73, 73 or in the vicinity of a side downstream of the merging point, i.e., the turning joint for revolution 75, i.e., the sixth path 735.

According to this configuration, the position of the vacuum gauge 80 is farther from the container 40 than in Embodiment 2-1, nevertheless the vacuum gauge 80 is provided at a position near the container 40, so that a vacuum state in each of the containers 40 can be not only accurately recognized but also readily recognized with no time difference.

Embodiment 2-7

Figure 17:
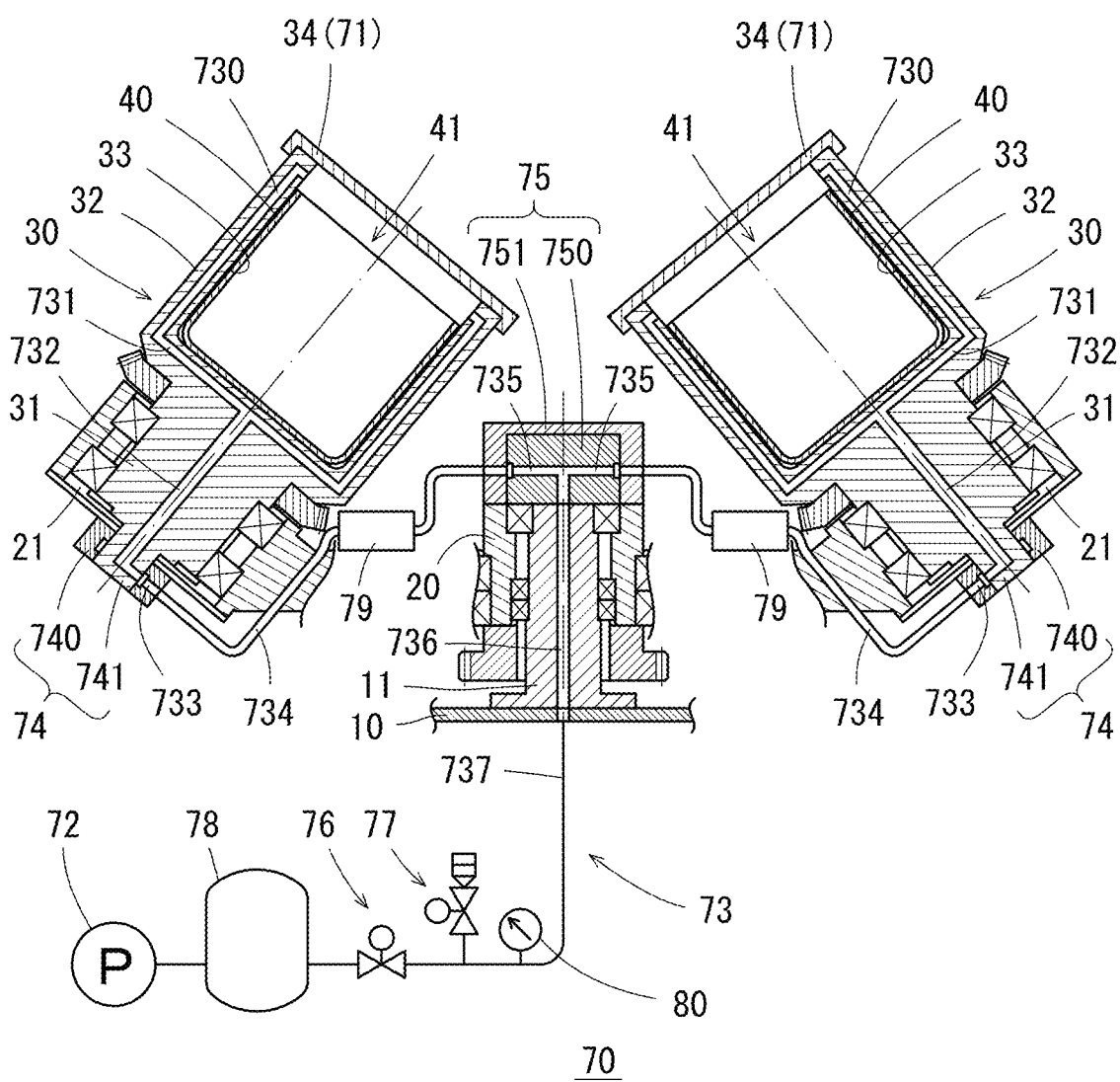
FIG. 17 is a chief part sectional view of a stirring and defoaming device according to Embodiment 2-7.

In this embodiment, as illustrated in FIG. 17, one vacuum gauge 80 is provided in accordance with both of the suction paths 73, 73 that have merged, and is arranged in the suction path 73 exiting from the revolution center to reach the vacuum pump 72, i.e., the suction path 73 outside the system, i.e., the eighth path 737.

According to this configuration, the position of the vacuum gauge 80 is farther from the container 40 than in Embodiment 2-6, nevertheless the vacuum gauge 80 is provided at a position away from the vacuum pump 72 and nearer to the container 40, so that a vacuum state in each of the containers 40 can be not only accurately recognized but also readily recognized with reduced time difference.

Embodiment 3

Figure 18:
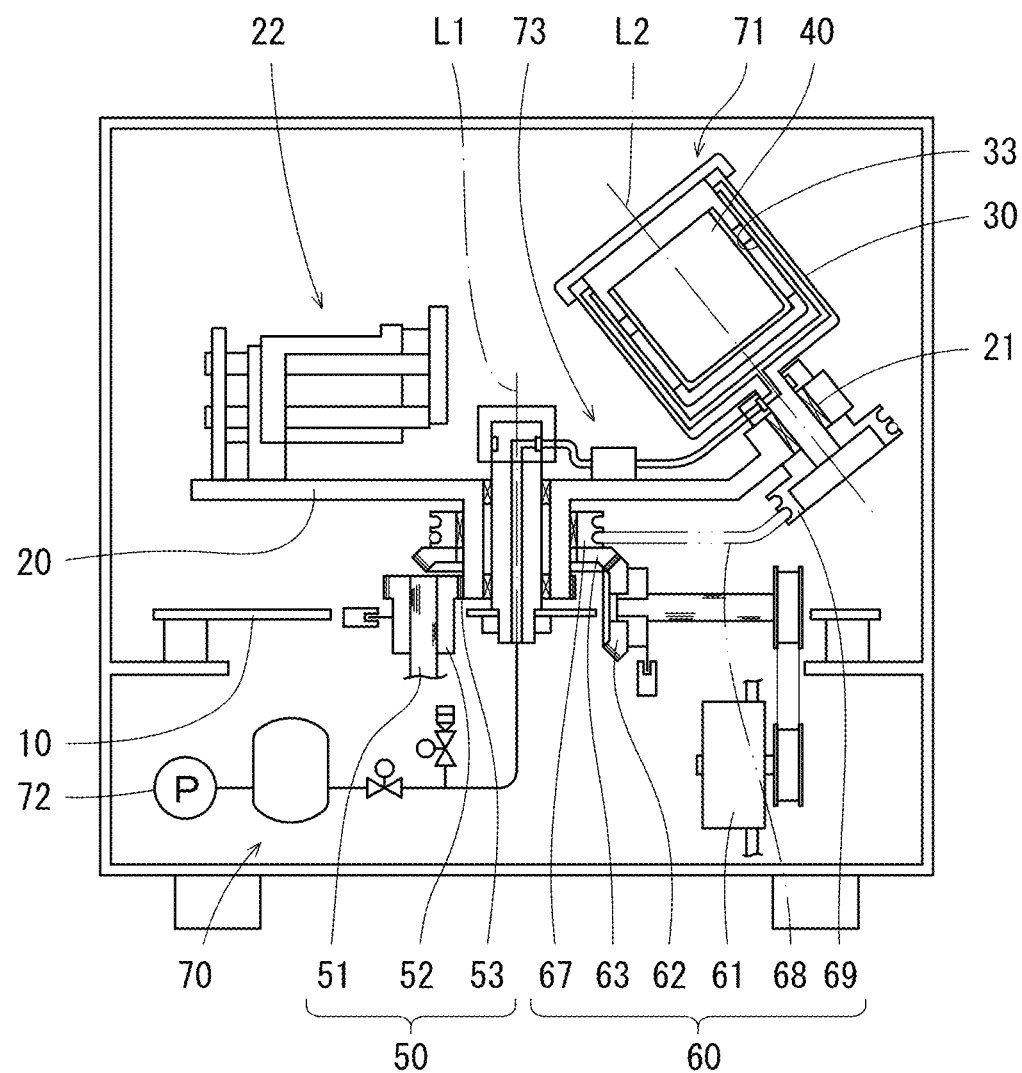
FIG. 18 is a sectional view of a stirring and defoaming device according to Embodiment 3.

Hereinafter, Embodiment 3 of a stirring and defoaming device according to the present invention is described with reference to FIGS. 18 and 19. This embodiment is basically the same as Embodiment 1, but is different therefrom in that only one container 40 is provided, and there is only one system of a suction path 73 accordingly. It should be noted that this embodiment is also different in that a rotation applying unit 60 is not entirely a gear transmission mechanism, but uses a transmission mechanism of pulleys 67, 69 and a belt 68 in part (between revolution and rotation). Moreover, since there is only one container 40, a position-variable balance weight 22 that is position-adjustable is also provided on a revolution body 20 and opposite the container 40, in order to keep the balance of revolution.

Specifically,
the suction path 73 is composed of
i) a first path 730 having a first end opening in an inner surface of a peripheral wall portion 32 of a vacuum chamber 33, opening in the vacuum chamber 33, and passing through the inside of the peripheral wall portion 32 of the vacuum chamber 33, and a second end reaching a bottom portion of the vacuum chamber 33,
ii) a second path 731 having a first end connected to the second end of the first path 730 and passing through the inside of the bottom portion of the vacuum chamber 33, and a second end reaching a rotation center at the bottom portion of the vacuum chamber 33,
iii) a third path 732 having a first end connected to the second end of the second path 731 and passing through the inside of a rotation body main portion 31, and a second end reaching an end (a lower end in the present embodiment) opposite the tip of the rotation body main portion 31,
iv) a fourth path 733 having a first end connected to the second end of the third path 732 and passing through the inside of a turning joint for rotation 74 provided at the opposite end of the rotation body main portion 31, and a second end reaching an outer surface of the turning joint for rotation 74,
v) a fifth path 734 having a first end connected to the second end of the fourth path 733 and running toward a revolution center of a revolution body 20, and a second end reaching an outer surface of a turning joint for revolution 75 provided at a tip (an upper end in the present embodiment) of a revolution shaft 11,
vi) a sixth path 735 having a first end connected to the second end of the fifth path 734 and passing through the inside of the turning joint for revolution 75, and a second end reaching a joint surface of the turning joint for revolution 75 to the revolution shaft 11,
vii) a seventh path 736 having a first end connected to the second end of the sixth path 735, passing through the inside of the revolution shaft 11, and passing through a base 10, and a second end reaching the outside of the system (a region outside the system as a movable region of device elements related to revolution and rotation, i.e., a region that does not interfere with movable device elements; in the present embodiment, a region below the base 10), and
viii) an eighth path 737 having a first end connected to the second end of the seventh path 736, and a second end connected to a vacuum pump 72.

Embodiment 3-1

Figure 19:
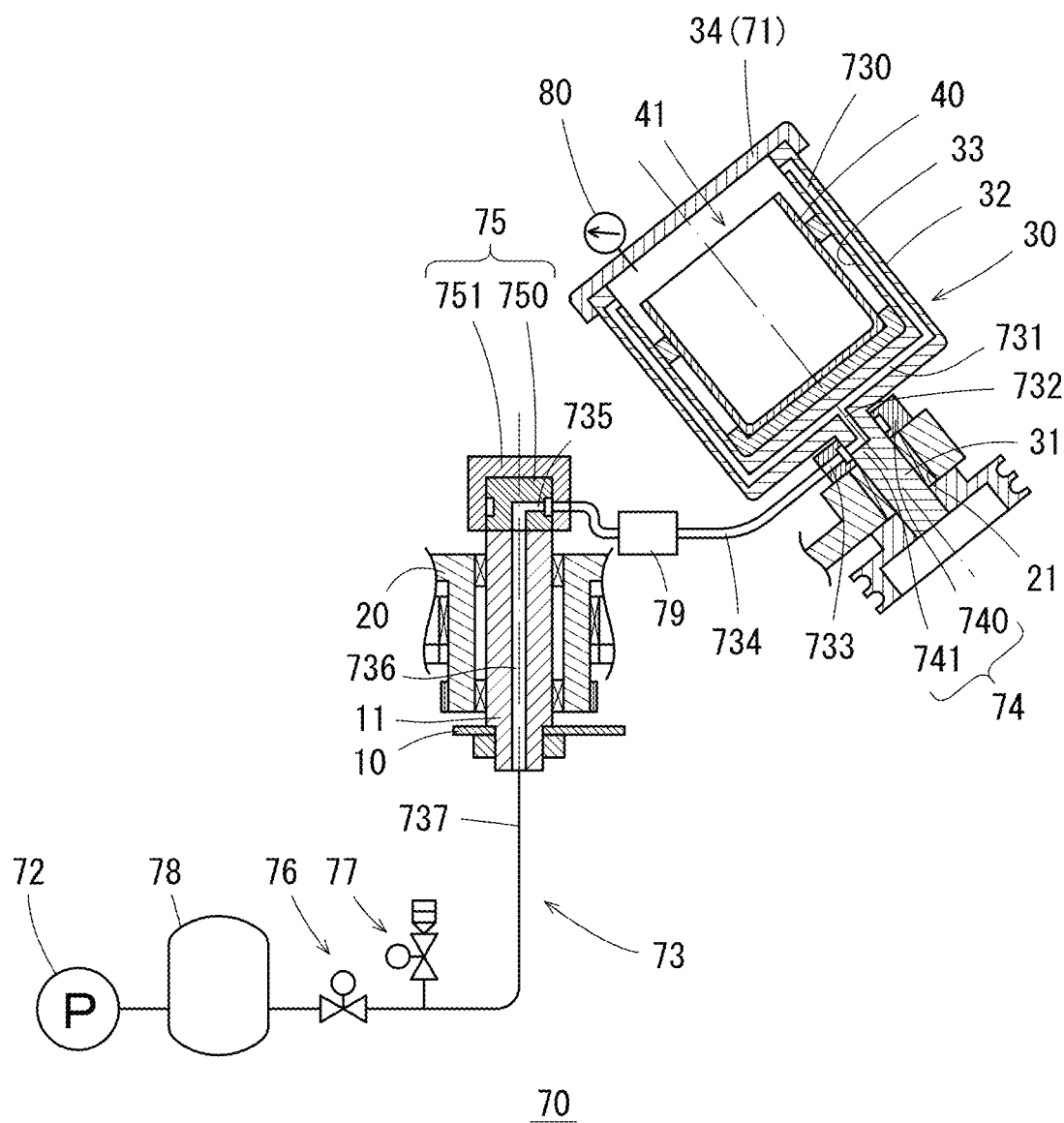
FIG. 19 is a chief part sectional view of a stirring and defoaming device according to Embodiment 3-1.

In this embodiment, as illustrated in FIG. 19, one vacuum gauge 80 is provided in association with the suction path 73, and is arranged on an outer surface side of a sealing lid 34 of the vacuum chamber 33. In this instance, a port of the vacuum gauge 80 is positioned inside the vacuum chamber 33 through the sealing lid 34, the sealing lid 34 faces an opening 41 of the container 40, and therefore the port of the vacuum gauge 80 is located at a position near the opening 41 of the container 40. This is one pattern in which the vacuum gauge 80 is arranged at a position nearest to (the opening 41 of) the container 40.

According to this configuration, as in Embodiment 1-1, the vacuum gauge 80 is provided at a position nearest to the container 40, so that a vacuum state in the container 40 can be not only accurately recognized but also readily recognized with no time difference.

Embodiment 3-2

Figure 20:
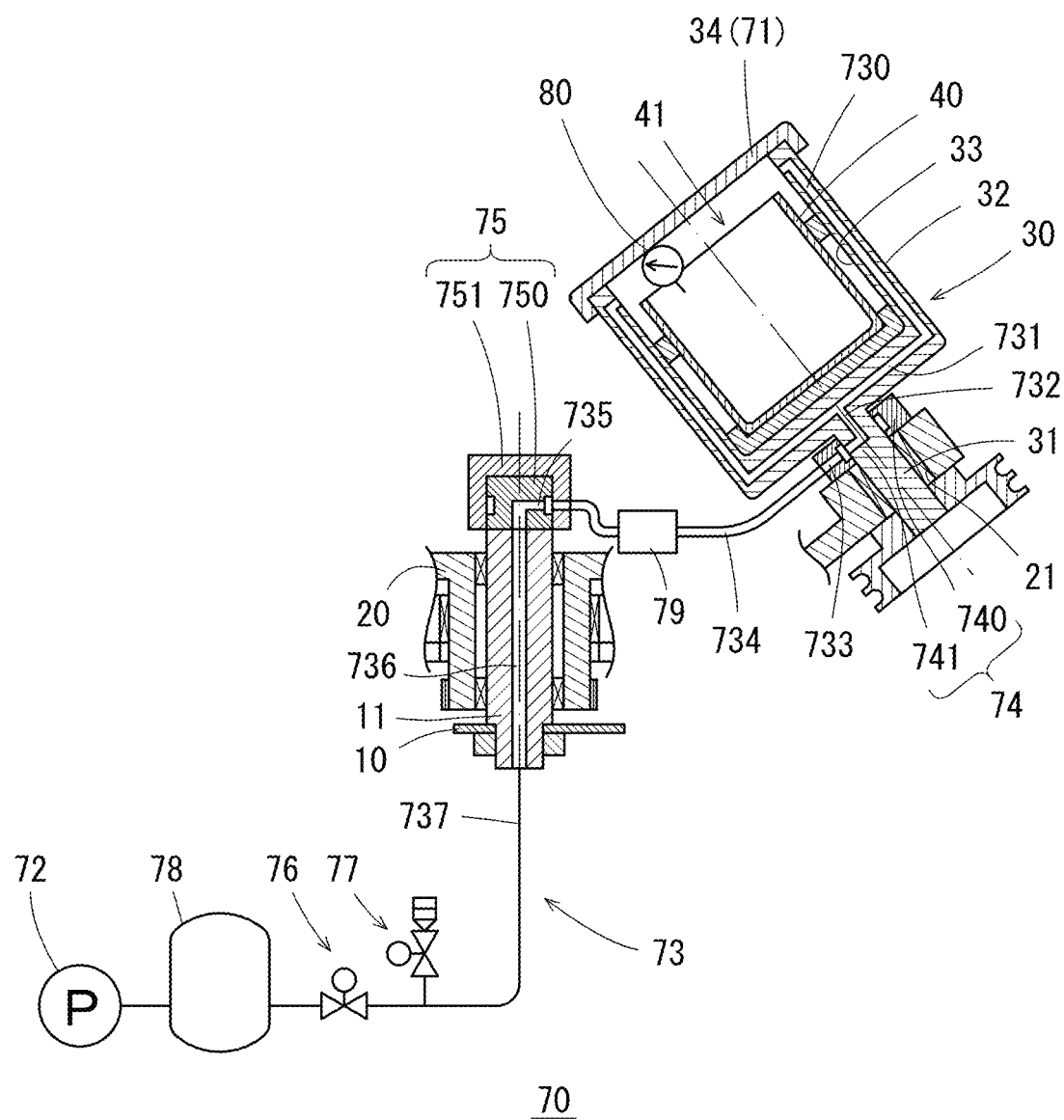
FIG. 20 is a chief part sectional view of a stirring and defoaming device according to Embodiment 3-2.

In this embodiment, as illustrated in FIG. 20, one vacuum gauge 80 is provided in association with the suction path 73, and is arranged on an inner surface side of the sealing lid 34 of the vacuum chamber 33. A port of the vacuum gauge 80 is positioned inside the vacuum chamber 33, and is located at a position near the opening 41 of the container 40. This is another pattern in which the vacuum gauge 80 is arranged at a position nearest to (the opening 41 of) the container 40.

According to this configuration as well, as in Embodiment 3-1, the vacuum gauge 80 is provided at a position nearest to the container 40, so that a vacuum state in the container 40 can be not only accurately recognized but also readily recognized with no time difference.

Embodiment 3-3

Figure 21:
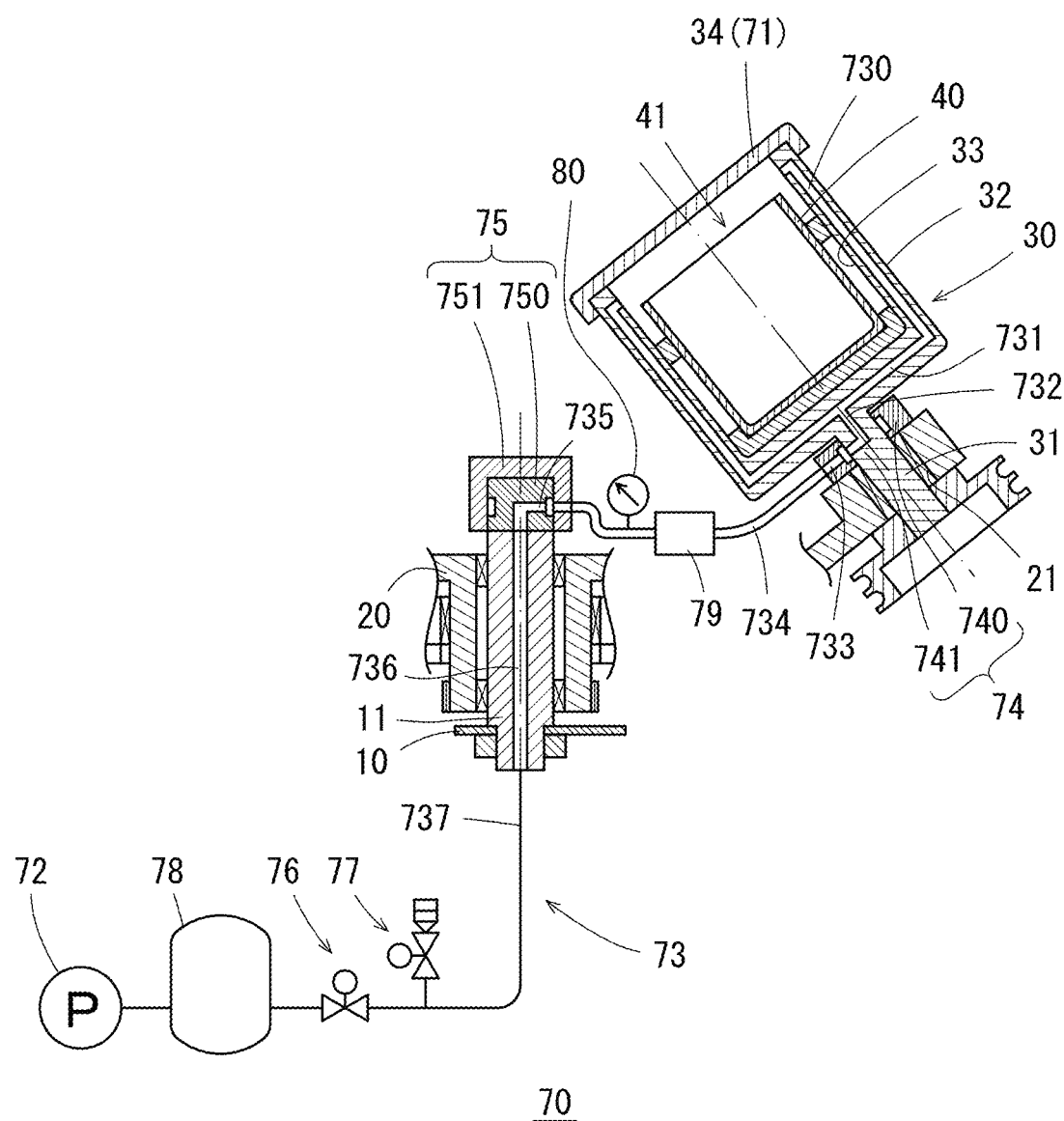
FIG. 21 is a chief part sectional view of a stirring and defoaming device according to Embodiment 3-3.

In this embodiment, as illustrated in FIG. 21, one vacuum gauge 80 is provided in association with the suction path 73, and each is arranged in the suction path 73 exiting from a rotation body 30 to reach the revolution center, i.e., the suction path 73 between the turning joint for rotation 74 and the turning joint for revolution 75, i.e., the fifth path 734. The vacuum gauge 80 may be arranged in the fourth path 733.

According to this configuration, the position of the vacuum gauge 80 is farther from the container 40 than in Embodiment 3-1, nevertheless the vacuum gauge 80 is provided at a position near the container 40, so that a vacuum state in the container 40 can be not only accurately recognized but also readily recognized with no time difference.

Embodiment 4

Figure 23A:
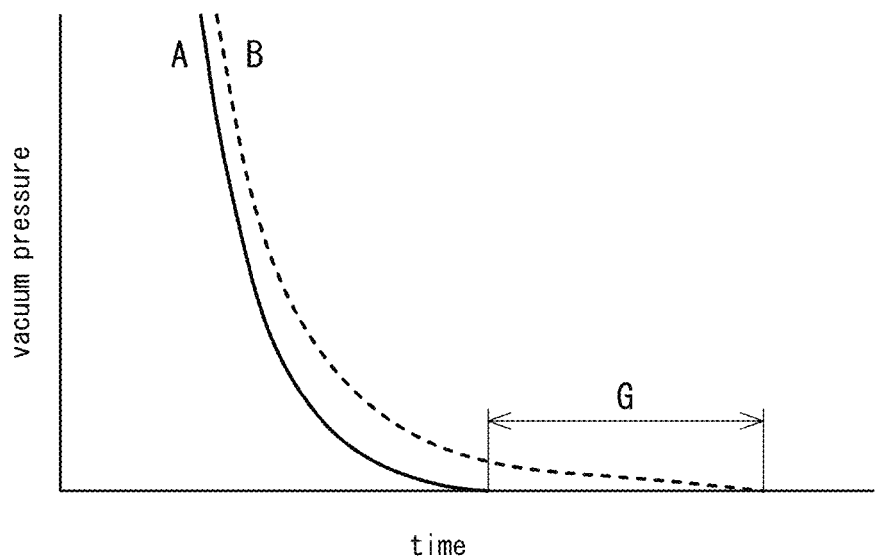
FIGS. 23A and 23B are explanatory views of one example of vacuum control enabled by the stirring and defoaming devices according to Embodiments 1-1 to 1-7 and Embodiment 2-5.
Figure 23B:
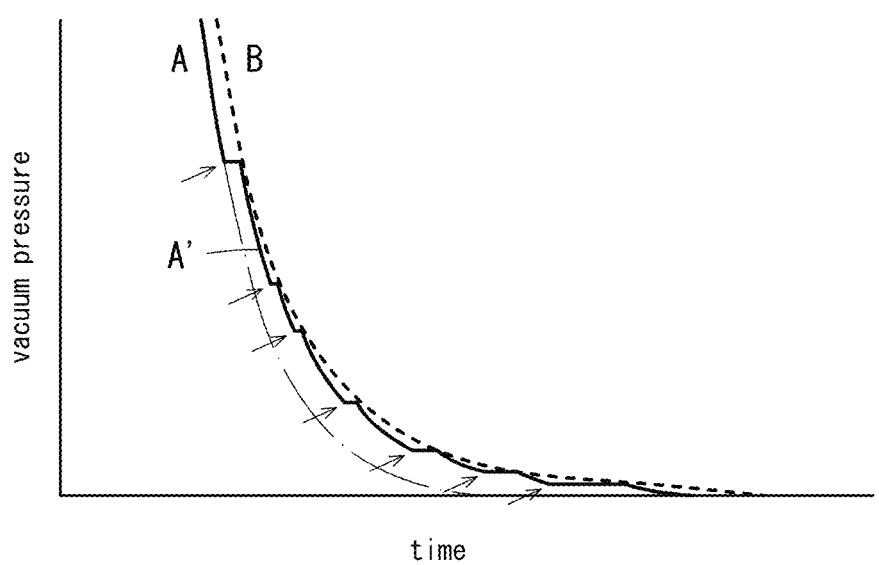

While it has been described that the stirring and defoaming device according to each of the embodiments described above can carry out a variety of stirring and defoaming methods by individually controlling the number of revolution turns, the number of rotation turns, a degree of vacuum, and the actuation timing thereof, vacuum control enabled by the stirring and defoaming devices according to Embodiments 1-1 to 1-7 and Embodiment 2-5 is described here as one example with reference to FIGS. 23A and 23B.

For example, when there is a slight vacuum leakage in a suction path 73 for one container 40 of two containers 40, 40, the arrival times before the inside of one container 40 and the inside of another container 40 arrive at a set vacuum pressure differ (time difference G), as illustrated in FIG. 23A. In this case, there is concern that a difference in the degree of progress of the defoaming (degree of residual air bubbles) may occur between the two containers 40, 40. Thus, as illustrated in FIG. 23B, vacuum control is performed to attune a low-pressure side to a high-pressure side by suitably on-off controlling an on-off valve 76 of a suction path on the low-pressure side (the position of an arrow is a point of closing the on-off valve 76, and a position of starting pressure drop ahead is a point of opening the on-off valve 76) so as to adapt to the high-pressure (low-vacuum-degree) side, while monitoring a measurement value difference (pressure difference) of two vacuum gauges 80, 80 during vacuum processing. According to this vacuum processing, an arrival time before the inside of each of the containers 40 arrives at the set vacuum pressure coincides, so that a difference of defoaming processing of materials can be prevented from occurring between the two containers 40, 40.

Although this vacuum control is a control that attunes a low-pressure side to a high-pressure side, a vacuum control of attuning a high-pressure side to a low-pressure side, or a vacuum control of attuning to an intermediate value between the two sides is also possible, by providing a flow regulation valve in each suction path 73 and adjusting the valve travel of the suction path 73.

OTHER EMBODIMENTS

It should be noted that the stirring and defoaming device according to the present invention is not limited to the embodiments described above, and various modifications can be made without departing from the spirit of the present invention.

First, in the mechanism according to each of the embodiments described above, the revolution shaft 11 of the fixed shaft that does not turn is provided on the base 10, and the revolution body 20 is turnably supported on the revolution shaft 11 to become turnable. Accordingly, the turning joint for revolution 75 is provided at a tip (an upper end in the embodiments described above) of the revolution shaft 11 which is a place where the suction path 73 shifts from a turning system to a static system. In this case, a suction path is as follows: vacuum chamber (container)→the inside of rotation body→turning joint for rotation→revolution center→turning joint for revolution→the inside of revolution shaft→outside the system→vacuum pump. However, the present invention is not limited thereto. For example, in a mechanism as in each of Patent Literatures 4 and 5, a revolution body includes a revolution shaft, the revolution shaft is turnably supported on a base, and thereby the revolution body becomes turnable. Accordingly, a turning joint for revolution may be provided at a lower end of a revolution shaft which is a place where a suction path shifts from a turning system to a static system. In this case, a suction path is as follows: vacuum chamber (container)→the inside of rotation body→turning joint for rotation→revolution center→the inside of revolution shaft→turning joint for revolution→outside the system→vacuum pump.

Moreover, in each of the embodiments described above, the vacuum pump 72 is arranged below the revolution shaft 11, and the suction path 73 passes through the inside of the revolution shaft 11 accordingly. However, the present invention is not limited thereto. For example, as in FIG. 3 of Patent Literature 2 and in Patent Literature 3, a rigid or flexible tube may extend upward toward a revolution center from a sealing lid of a vacuum chamber, and be connected to a turning joint for revolution provided in the revolution center in an upper part of a housing. In this case, a suction path is as follows: vacuum chamber (container)→upward toward a revolution center→turning joint for revolution-→outside the system→vacuum pump.

Moreover, in each of the embodiments described above, the turning joint for rotation 74 is provided opposite (a lower end in the embodiments described above) to the tip of the rotation body main portion 31, where a suction path is provided toward the turning joint for revolution 75 of the revolution center. However, the present invention is not limited thereto. For example, a turning joint for rotation may be provided at a tip (an upper end in the embodiments described above) of the rotation body main portion 31 or an intermediate part, where a suction path may be provided toward a turning joint for revolution of the revolution center or a revolution shaft, or a suction path may be provided toward a turning joint for revolution of the revolution center or a revolution shaft from a sealing lid of a vacuum chamber, or a suction path may be provided toward a turning joint for revolution of the revolution center or a revolution shaft from a peripheral wall portion of a vacuum chamber, as in FIG. 3 of Patent Literature 5.

Moreover, in each of the embodiments described above, the rotation body 30 includes a vacuum chamber 33 as a configuration for sealing a container to directly suck air in the container. However, the present invention is not limited thereto. For example, as in Patent Literature 3, a rotation body may only hold a container, and a sealing lid removably mounted to an end (opening) of the container may seal the container. Moreover, a lid may be mounted to the opening 41 of the container 40, a hole may be provided in this lid, and thereby the container 40 may communicate with the inside of the vacuum chamber 33. In this way, when the container 40 equipped with a lid having a hole is stored in the vacuum chamber 33, the hole provided in the lid functions as an opening, and constitutes a part of the suction path.

Moreover, in each of the embodiments described above, the first end of the first path 730 of the suction path 73 is open at a position higher than the opening 41 of the container 40 in the inner surface of the peripheral wall portion 32 of the vacuum chamber 33. Thus, it is difficult for materials spilled from the container 40 to reach the first end of the first path 730, and the problem of materials entering and blocking the suction path 73 can be prevented from occurring. However, the present invention is not limited thereto. When the problem of blocking the suction path 73 cannot occur, is negligible, or can be prevented by use of other means, the opening position of the first end of the first path 730 may be a position lower than the opening 41 of the container 40, e.g., the inner surface of a lower half region of the peripheral wall portion 32 of the vacuum chamber 33, or the inner surface of the bottom portion of the vacuum chamber 33.

Moreover, in each of the embodiments described above, the vacuum pump 72 is used as a vacuum generation source. However, the present invention is not limited thereto. For example, various well-known vacuum generation sources can be adopted as a vacuum generation source, such as a pump other than a vacuum pump, or an ejector.

Moreover, in each of the embodiments described above, the vacuum means 70 includes the open valve 77, the buffer tank 78, and the filter 79. However, the present invention is not limited thereto. For example, as long as the sealing lid 34 can be removed and the vacuum chamber 33 can be opened without the open valve 77 or by other means, the open valve 77 does not need to be provided. Moreover, the buffer tank 78 and the filter 79 are not indispensable. Moreover, even when the buffer tank 78 is provided, each of the suction paths 73, more specifically, each of the eighth paths 737 in Embodiments 1-1 to 1-6 and 1-8 described above may be provided with a buffer tank 78, instead of the suction paths 73 being provided with one buffer tank 78 as illustrated in each of the embodiments described above.

Moreover, in each of the embodiments described above, the vacuum means 70 includes the on-off valve 76. Finer vacuum control becomes possible by providing a flow regulation valve in addition to the on-off valve 76, or providing a flow regulation valve in place of the on-off valve 76 when the flow regulation valve also functions as an on-off valve.

Moreover, in each of the embodiments described above, the vacuum gauge 80 measures a degree of vacuum in the container 40 and wirelessly transmits the measurement value to a control unit of the stirring and defoaming device, and the control unit of the stirring and defoaming device controls the operation, based on the measurement value. However, the present invention is not limited thereto. For example, a vacuum gauge may be provided with a control unit, so that the vacuum gauge not only measures a degree of vacuum in a container, but also sets operation conditions based on the measurement value, and controls the operation (a substitute for the control unit of the stirring and defoaming device (a central control unit)), or an operation condition set by the vacuum gauge may be transmitted to the control unit of the stirring and defoaming device (the central control unit).

Moreover, in each of the embodiments described above, each of the vacuum gauges 80 is arranged at the same place. However, the present invention is not limited thereto. For example, the arrangement place of each of the vacuum gauges 80 may be different; one vacuum gauge 80 may be arranged in the vacuum chamber 33 as in Embodiment 1-1, 1-2, 2-1, or 2-2, and the other vacuum gauge 80 may be arranged in a conduit as in Embodiment 1-3, 1-4, or 2-3.

Moreover, in each of the embodiments described above, a digital vacuum gauge is used for the vacuum gauge 80. However, the present invention is not limited thereto. For example, the vacuum gauge may be an analog vacuum gauge.

Figure 24A:
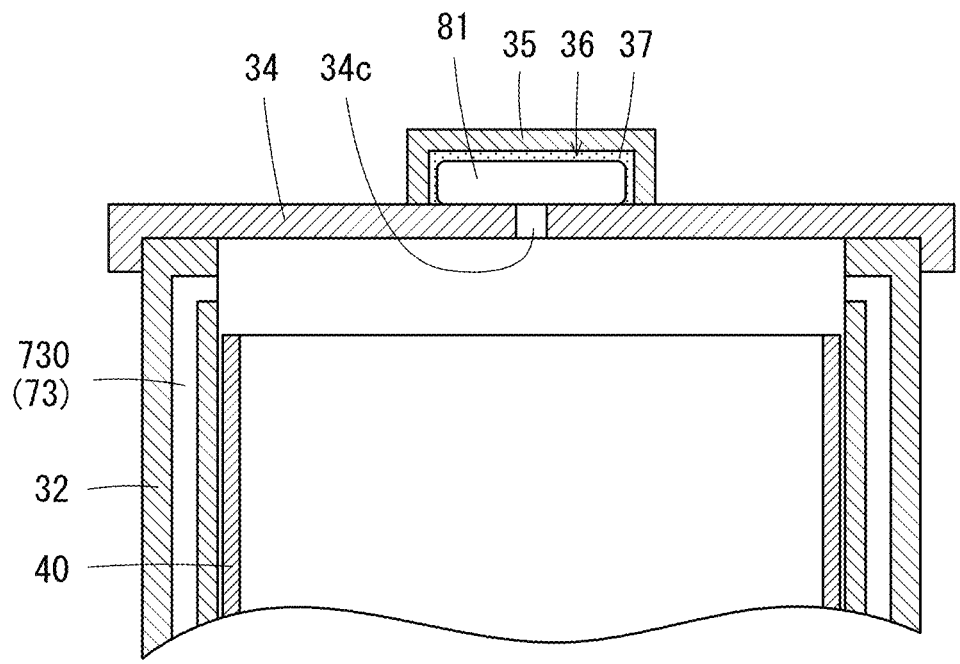
FIGS. 24A and 24B are explanatory views regarding the arrangement of a vacuum measurement unit according to another embodiment.
Figure 24B:
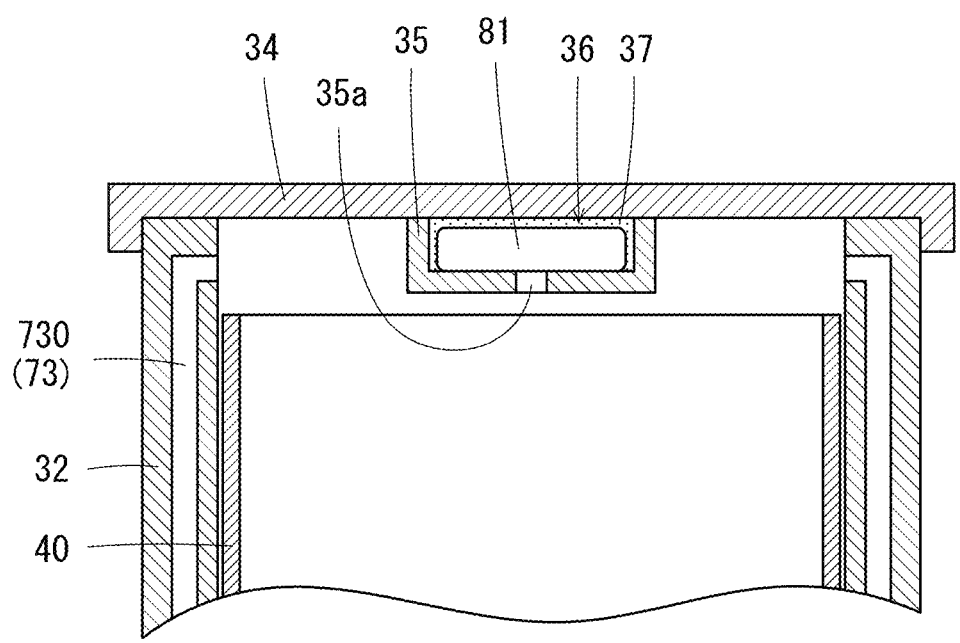

Moreover, in recent years, a sensor unit (data logger) has been available commercially in which various sensors such as an air pressure sensor, an acceleration sensor, a temperature sensor, a humidity sensor, a gyroscope sensor, a light intensity sensor, a distance sensor, a magnetic sensor, a sound sensor, and a strain sensor are packaged in a small palm-sized housing. This sensor unit has a wireless communication function as in the vacuum gauge 80 described above, which can wirelessly transmit various measurement values to the control unit of the stirring and defoaming device, can also measure a degree of vacuum (vacuum pressure) with the air pressure sensor, and can therefore be used as a vacuum measurement means. An arrangement method of a sensor unit 81 is illustrated in FIGS. 24A and 24B. FIG. 24A illustrates an aspect of arranging on the outer surface side of the sealing lid 34 of the vacuum chamber 33, and FIG. 24B illustrates an aspect of arranging on the inner surface side of the sealing lid 34. In the former, a through-hole 34c is formed at an appropriate part of the sealing lid 34, a cover 35 is removably mounted to the outer surface of the sealing lid 34 so as to cover the through-hole 24c, and the sensor unit 81 is arranged in an inner space (storage portion) 36 of the cover 35. When it is necessary to immobilize the sensor unit 81 in the storage portion 36, a cushioning material 37 or the like is intermediately fitted in the storage portion 36. The cover 35 is airtightly mounted to the sealing lid 34, and the inside of the storage portion 36 and the inside of the container 40 communicate with each other via the through-hole 34c. Therefore, the inside of the storage portion 36 and the inside of the container 40 are at the same degree of vacuum during vacuum processing. In the latter, a through-hole 35a is formed at an appropriate part of the cover 35, the cover 35 is removably mounted to the inner surface of the sealing lid 34, and the sensor unit 81 is arranged in the inner space (storage portion) 36 of the cover 35. The inside of the storage portion 36 and the inside of the container 40 communicate with each other via the through-hole 35a. Therefore, the inside of the storage portion 36 and the inside of the container 40 are at the same degree of vacuum during vacuum processing.

Moreover, a gear transmission mechanism is used as a braking force transmission mechanism of the rotation applying unit 60 in Embodiments 1 and 2 described above, and a pulley/belt transmission mechanism is partly used as a braking force transmission mechanism of the rotation applying unit 60 in Embodiment 3 described above. However, the present invention is not limited thereto. For example, a pulley/belt transmission mechanism may be partly used in Embodiments 1 and 2, as in Embodiment 3, or all transmission mechanisms may be gear transmission mechanisms in Embodiment 3, as in Embodiments 1 and 2. Moreover, various well-known braking force transmission mechanisms can be adopted as a braking force transmission mechanism of the rotation applying unit. It should be noted that when the stirring and defoaming device becomes larger, turning force and inertial force resulting from turning become greater, so that a gear transmission mechanism that can certainly transmit braking force is preferable. On the other hand, when the device is small and the number of containers is one, an inexpensive pulley/belt transmission mechanism is preferable, but whichever braking force transmission mechanism to adopt is a matter to be suitably determined by design.

Moreover, in each of the embodiments described above, a powder brake is used as the brake device 61 of the rotation applying unit 60. However, the present invention is not limited thereto. For example, a driving motor for revolution and a driving motor for rotation may be separately provided, and the rotation body may be turned by the driving motor for rotation. Moreover, various well-known mechanisms can be adopted as a mechanism of the rotation applying unit.

Moreover, in each of the embodiments described above, the rotation axis L2 is tilted, for example, about 40 degrees relative to perpendicular. However, the present invention is not limited thereto. The angle of the rotation axis can be set at any angle ranging from 0 degrees (perpendicular) to 90 degrees (level).

Moreover, in Embodiments 1 and 2 described above, two containers 40 are provided as the case of a plurality of containers 40. However, the present invention is not limited thereto. For example, the number of containers may be three, four, or the like, and are not particularly limited.

INDUSTRIAL APPLICABILITY

Each of the inventions above enables appropriate management and/or control of a vacuum state, and is extremely useful for various material manufacturing processes such as mixing, kneading, dispersion, reactions, crushing, and emulsification.

The invention claimed is:

1. A stirring and defoaming device comprising:
a revolution body turnable around a revolution axis;
at least two or more rotation bodies turnable around respective at least two or more rotation axes on the revolution body, and capable of holding respective containers; and
a vacuum unit that sucks air in each of the containers to bring an inside of each of the containers into a vacuum state, wherein
the vacuum unit includes
sealing bodies that seal the respective containers,
a vacuum generation source,
a suction path running toward a revolution center with each of the containers as one of starting ends, passing through the revolution center to go outside a system, and reaching the vacuum generation source placed outside the system, at least part from each of the starting ends of the suction path being one of independent paths in association with a corresponding one of the containers, and
at least two or more vacuum measurement units each provided on a corresponding one of the independent paths.

2. The stirring and defoaming device according to claim 1, wherein
a vacuum measurement unit is provided in a space of a container sealed by a sealing body.

3. The stirring and defoaming device according to claim 2, wherein
a rotation body includes
a rotation body main portion, and
a peripheral wall portion provided at a tip of the rotation body main portion, and serving as a storage recess that stores the container inside,
the sealing body being a sealing lid that is removably mounted to an end of the peripheral wall portion, and seals the storage recess, and
the vacuum measurement unit being provided in the sealing lid.

4. The stirring and defoaming device according to claim 1, wherein
a vacuum measurement unit has a power supply therein, and has a wireless communication function.

5. The stirring and defoaming device according to claim 1, wherein
the vacuum unit further includes at least two or more individually controllable on-off valves each provided on a corresponding one of the independent paths.

6. The stirring and defoaming device according to claim 1, further comprising a revolution shaft that defines the revolution axis, wherein
the suction path includes
a path passing through an inside of a rotation body with a container as a starting end,
a path exiting from the rotation body to run toward the revolution center,
a path passing through an inside of the revolution shaft, and
a path exiting from the revolution shaft to go outside the system,
the path passing through the inside of the rotation body with the container as the starting end and the path exiting from the rotation body to run toward the revolution center are connected to each other via a turning joint, and
either the path exiting from the rotation body to run toward the revolution center or the path exiting from the revolution shaft to go outside the system and the path passing through the inside of the revolution shaft are connected to each other via a turning joint.

7. The stirring and defoaming device according to claim 6, wherein
at least a path passing through an inside of a rotation body with a container as a starting end, a path exiting from a rotation body to run toward the revolution center, and a path passing through an inside of the revolution shaft serve as an independent path in association with each of the containers.

8. The stirring and defoaming device according to claim 6, wherein
the independent paths merge each other in a turning joint between paths exiting from rotation bodies to run toward the revolution center and the path passing through the inside of the revolution shaft.

* * * * *